(12) United States Patent
Imamura

(10) Patent No.: US 12,437,446 B2
(45) Date of Patent: Oct. 7, 2025

(54) IMAGE COMPARISON METHOD, IMAGE COMPARISON DEVICE, AND NON-TRANSITORY COMPUTER-READABLE RECORDING MEDIUM RECORDING IMAGE COMPARISON PROGRAM

(71) Applicant: SCREEN HOLDINGS CO., LTD., Kyoto (JP)

(72) Inventor: Atsushi Imamura, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 296 days.

(21) Appl. No.: 18/452,854

(22) Filed: Aug. 21, 2023

(65) Prior Publication Data
US 2024/0078709 A1    Mar. 7, 2024

(30) Foreign Application Priority Data
Sep. 1, 2022 (JP) .................. 2022-138973

(51) Int. Cl.
| | | |
|---|---|---|
| G06T 7/00 | (2017.01) | |
| G06K 15/02 | (2006.01) | |
| G06T 7/12 | (2017.01) | |
| G06T 7/136 | (2017.01) | |
| G06T 7/174 | (2017.01) | |

(52) U.S. Cl.
CPC .............. *G06T 7/97* (2017.01); *G06T 7/12* (2017.01); *G06T 7/136* (2017.01); *G06T 7/174* (2017.01); *G06K 15/027* (2013.01); *G06T 2207/20224* (2013.01)

(58) Field of Classification Search
None
See application file for complete search history.

(56) References Cited

U.S. PATENT DOCUMENTS

2010/0166296 A1*  7/2010  Sankoh .................. G06T 17/10
                                                          382/154
2015/0220809 A1*  8/2015  Kawabata .......... H04N 1/00015
                                                          382/195

FOREIGN PATENT DOCUMENTS

| JP | 2000066364 A | * | 3/2000 |
| JP | 2006093949 A | * | 4/2006 |
| JP | 2019-211319 A | | 12/2019 |

* cited by examiner

*Primary Examiner* — SJ Park
*Assistant Examiner* — Caroline E. Depalma
(74) *Attorney, Agent, or Firm* — Rimon P.C.

(57) ABSTRACT

After a difference image between original image and calibration image is generated, a candidate image of an edge region is generated. Thereafter, an edge image is generated based on the original image, the calibration image, and the candidate image. At that time, the processing target pixel (pixel constituting the candidate image) is determined to be a pixel constituting the edge region when a difference between a pixel value of at least one of nine comparison target pixels in the original image and a pixel value of the processing target pixel in the calibration image is less than or equal to a first threshold value, and when a difference between a pixel value of at least one of nine comparison target pixels in the calibration image and a pixel value of the processing target pixel in the original image is less than or equal to the first threshold value.

15 Claims, 32 Drawing Sheets

IMAGE COMPARISON METHOD, IMAGE COMPARISON DEVICE, AND NON-TRANSITORY COMPUTER-READABLE RECORDING MEDIUM RECORDING IMAGE COMPARISON PROGRAM

BACKGROUND OF THE INVENTION

Field of the Invention

The present invention relates to an image comparison method, an image comparison device, and an image comparison program for comparing two images (for example, a pre-calibration image and a post-calibration image) created for printing.

Description of Related Art

In a printing operation, two images created for printing are often compared. For example, an image to be printed may be corrected by calibration before actual printing is performed by a printing apparatus. In such a case, a person who instructs correction (correction instructor) is generally different from a person who actually corrects the image to be printed (correction worker), and the correction instructor needs to perform plate inspection in which a pre-calibration image and a post-calibration image are compared to confirm whether the correction worker has correctly corrected the image as instructed. In the present specification, the term "plate inspection" is used not in the meaning of inspection of plate in plate printing, but in the meaning of so-called "digital plate inspection" in plateless printing.

In general, the software for plate inspection is provided with a function of displaying a portion where there is a difference between the pre-calibration image and the post-calibration image on a screen of a computer. The correction instructor can easily confirm whether the correction worker has correctly corrected the image as instructed by using such software for plate inspection.

In relation to the present invention, Japanese Laid-Open Patent Publication No. 2019-211319 discloses the invention of an image defect detection device capable of detecting a defect of a minute point or a defect in which a line is shortened. This image defect detection device includes: a first comparison unit that sets a pattern misalignment allowable range for a positional misalignment of a reference pattern or the like of an inspection target included in a reference image, and compares an inspection image including the inspection target with the reference image in which the pattern misalignment allowable range is set; a second comparison unit that sets a pattern misalignment allowable range for a positional misalignment of a pattern or the like of an inspection target included in the inspection image, and compares a reference image including the inspection target with the inspection image in which the pattern misalignment allowable range is set; and a determination unit that performs determination of defectiveness. The determination unit determines that there is an image defect when a comparison result indicating that there is a defect in an image of the inspection target is included regarding either of the first comparison unit and the second comparison unit.

When plate inspection work is performed, it is preferable that only a portion actually corrected by calibration is detected as a difference portion (displayed on a screen of a computer as the difference portion). In this regard, a minute correction is also preferably detected as the difference portion as long as it is actually corrected according to the instruction of the correction instructor. For example, if a line of minimum line width is added, the added line should be detected as the difference portion.

Meanwhile, although the comparison between the pre-calibration image and the post-calibration image is performed using raster data obtained by RIP processing, resolution of image data included in submission data (data before the RIP processing) such as a PDF file may be different from resolution of raster data obtained by the RIP processing (i.e., resolution specified when the RIP processing is executed). Therefore, quantization errors and jaggies may occur during the RIP processing. Due to such quantization errors and the like, an edge portion of an image may be detected as the difference portion regarding an image portion that has not been corrected by the correction worker. For example, in a case where both the pre-calibration image and the post-calibration image include an image as illustrated in a portion denoted by a reference numeral 91 in FIG. 44, an edge portion of the image illustrated in the portion denoted by reference numeral 91 in FIG. 44 is detected as a difference portion as illustrated in FIG. 45. Such a phenomenon may occur, for example, when the correction worker moves a certain image and then moves the image back to the original position, or when the correction worker shifts the position of the entire image to be printed. In addition, the above phenomenon can also occur when there is a change in software used for image editing or when there is a change in the core part of the RIP processing due to version upgrade or the like. As above, in the conventional software for plate inspection, a portion that is not preferable to be detected as a difference portion may be detected as a difference portion (that is, erroneous detection may occur).

According to the image defect detection device disclosed in Japanese Laid-Open Patent Publication No. 2019-211319, in a case in which a slight positional misalignment occurs between two images, a portion where such a positional misalignment occurs is not detected as a difference portion. However, the processing time is long, because expanded images and contracted images are created for each of the reference image and the inspection image, and then comparison between the expanded image corresponding to the reference image and the inspection image, comparison between the contracted image corresponding to the reference image and the inspection image, comparison between the expanded image corresponding to the inspection image and the reference image, and comparison between the contracted image corresponding to the inspection image and the reference image are performed (that is, the comparison is performed for four combinations). Furthermore, when comparing images, an operation for comparison with 9 pixels is performed for each pixel (comparison for 18 pixels in consideration of positive and negative signs), and thus the processing time is long.

SUMMARY OF THE INVENTION

In view of the above circumstances, an object of the present invention is to provide an image comparison method capable of detecting a difference between two images in a short time while suppressing occurrence of erroneous detection caused by quantization errors and the like.

One aspect of the present invention is directed to an image comparison method for comparing a first image that is a multi-valued image and a second image that is a multi-valued image, the image comparison method including:

a difference image generation step of generating, based on the first image and the second image, a difference image that is a binary image representing a portion having a difference between the first image and the second image, the difference image including one or more partial difference images each including one or more pixels;

a contraction step of performing contraction processing to each of the one or more partial difference images to generate a contracted image including one or more partial contracted images;

an outline image generation step of generating an outline image by removing the contracted image from the difference image, the outline image including one or more partial outline images each including one or more pixels;

a candidate image generation step of generating a candidate image by removing a partial outline image that is adjacent to the partial contracted image from the one or more partial outline images, the candidate image representing a portion as a candidate of an edge region, the candidate image including one or more partial candidate images each including one or more pixels;

an edge image generation step of generating an edge image representing an edge region based on the first image, the second image, and the candidate image; and a comparison result image generation step of generating a comparison result image by removing the edge image from the difference image, wherein in the edge image generation step, assuming that one or more pixels constituting the one or more partial candidate images included in the candidate image are sequentially set as a processing target pixel, and that the processing target pixel and eight pixels around the processing target pixel are set as nine comparison target pixels, the processing target pixel is determined to be a pixel constituting the edge region when a first condition is satisfied, the first condition being a condition in which a difference between a pixel value of at least one of the nine comparison target pixels in the first image and a pixel value of the processing target pixel in the second image is less than or equal to a first threshold value, and a difference between a pixel value of at least one of the nine comparison target pixels in the second image and a pixel value of the processing target pixel in the first image is less than or equal to the first threshold value.

According to such a configuration, not all regions determined to have a difference between the first image and the second image are detected as difference portions, but a region obtained by excluding the edge region of the image from the regions determined to have a difference between the first image and the second image is detected as a difference portion. That is, it is possible to suppress occurrence of erroneous detection in which an edge portion of an image is detected as a difference portion although there is no difference. In the edge image generation step of generating the edge image representing the edge region, only a pixel constituting the candidate image representing a portion as a candidate of the edge region is set as the processing target pixel. Then, comparison between the pixel value of the processing target pixel in the second image and the pixel values of nine pixels centered on the processing target pixel in the first image, and comparison between the pixel value of the processing target pixel in the first image and the pixel values of nine pixels centered on the processing target pixel in the second image are performed. As a result, it is possible to detect a difference between two images in shorter time than before without causing erroneous detection. As above, it is possible to realize an image comparison method capable of detecting a difference between two images in short time while suppressing occurrence of erroneous detection due to quantization errors or the like.

Another aspect of the present invention is directed to an image comparison device for comparing a first image that is a multi-valued image and a second image that is a multi-valued image, the image comparison device including:

a processor configured to perform a difference image generation processing of generating, based on the first image and the second image, a difference image that is a binary image representing a portion having a difference between the first image and the second image, the difference image including one or more partial difference images each including one or more pixels;

a contracted image generation processing of performing contraction processing to each of the one or more partial difference images to generate a contracted image including one or more partial contracted images;

an outline image generation processing of generating an outline image by removing the contracted image from the difference image, the outline image including one or more partial outline images each including one or more pixels;

a candidate image generation processing of generating a candidate image by removing a partial outline image that is adjacent to the partial contracted image from the one or more partial outline images, the candidate image representing a portion as a candidate of an edge region, the candidate image including one or more partial candidate images each including one or more pixels;

an edge image generation processing of generating an edge image representing an edge region based on the first image, the second image, and the candidate image; and a comparison result image generation processing of generating a comparison result image by removing the edge image from the difference image, wherein in the edge image generation processing, the processor determines, assuming that one or more pixels constituting the one or more partial candidate images included in the candidate image are sequentially set as a processing target pixel, and that the processing target pixel and eight pixels around the processing target pixel are set as nine comparison target pixels, the processing target pixel to be a pixel constituting the edge region when a first condition is satisfied, the first condition being a condition in which a difference between a pixel value of at least one of the nine comparison target pixels in the first image and a pixel value of the processing target pixel in the second image is less than or equal to a first threshold value, and a difference between a pixel value of at least one of the nine comparison target pixels in the second image and a pixel value of the processing target pixel in the first image is less than or equal to the first threshold value.

Still another aspect of the present invention is directed to a non-transitory computer-readable recording medium recording an image comparison program for comparing a first image that is a multi-valued image and a second image that is a multi-valued image, the image comparison program causing a computer to execute:

a difference image generation step of generating, based on the first image and the second image, a difference image that is a binary image representing a portion having a difference between the first image and the second image, the difference image including one or more partial difference images each including one or more pixels;

a contraction step of performing contraction processing to each of the one or more partial difference images to generate a contracted image including one or more partial contracted images;

an outline image generation step of generating an outline image by removing the contracted image from the difference image, the outline image including one or more partial outline images each including one or more pixels;

a candidate image generation step of generating a candidate image by removing a partial outline image that is adjacent to the partial contracted image from the one or more partial outline images, the candidate image representing a portion as a candidate of an edge region, the candidate image including one or more partial candidate images each including one or more pixels;

an edge image generation step of generating an edge image representing an edge region based on the first image, the second image, and the candidate image; and a comparison result image generation step of generating a comparison result image by removing the edge image from the difference image, wherein in the edge image generation step, assuming that one or more pixels constituting the one or more partial candidate images included in the candidate image are sequentially set as a processing target pixel, and that the processing target pixel and eight pixels around the processing target pixel are set as nine comparison target pixels, the processing target pixel is determined to be a pixel constituting the edge region when a first condition is satisfied, the first condition being a condition in which a difference between a pixel value of at least one of the nine comparison target pixels in the first image and a pixel value of the processing target pixel in the second image is less than or equal to a first threshold value, and a difference between a pixel value of at least one of the nine comparison target pixels in the second image and a pixel value of the processing target pixel in the first image is less than or equal to the first threshold value.

These and other objects, features, modes, and advantageous effects of the present invention will become more apparent from the following detailed description of the present invention with reference to the accompanying drawings.

DETAILED DESCRIPTION OF PREFERRED EMBODIMENTS

Hereinafter, an embodiment of the present invention will be described with reference to the accompanying drawings.

1. Configuration of Printing System

Figure 1:
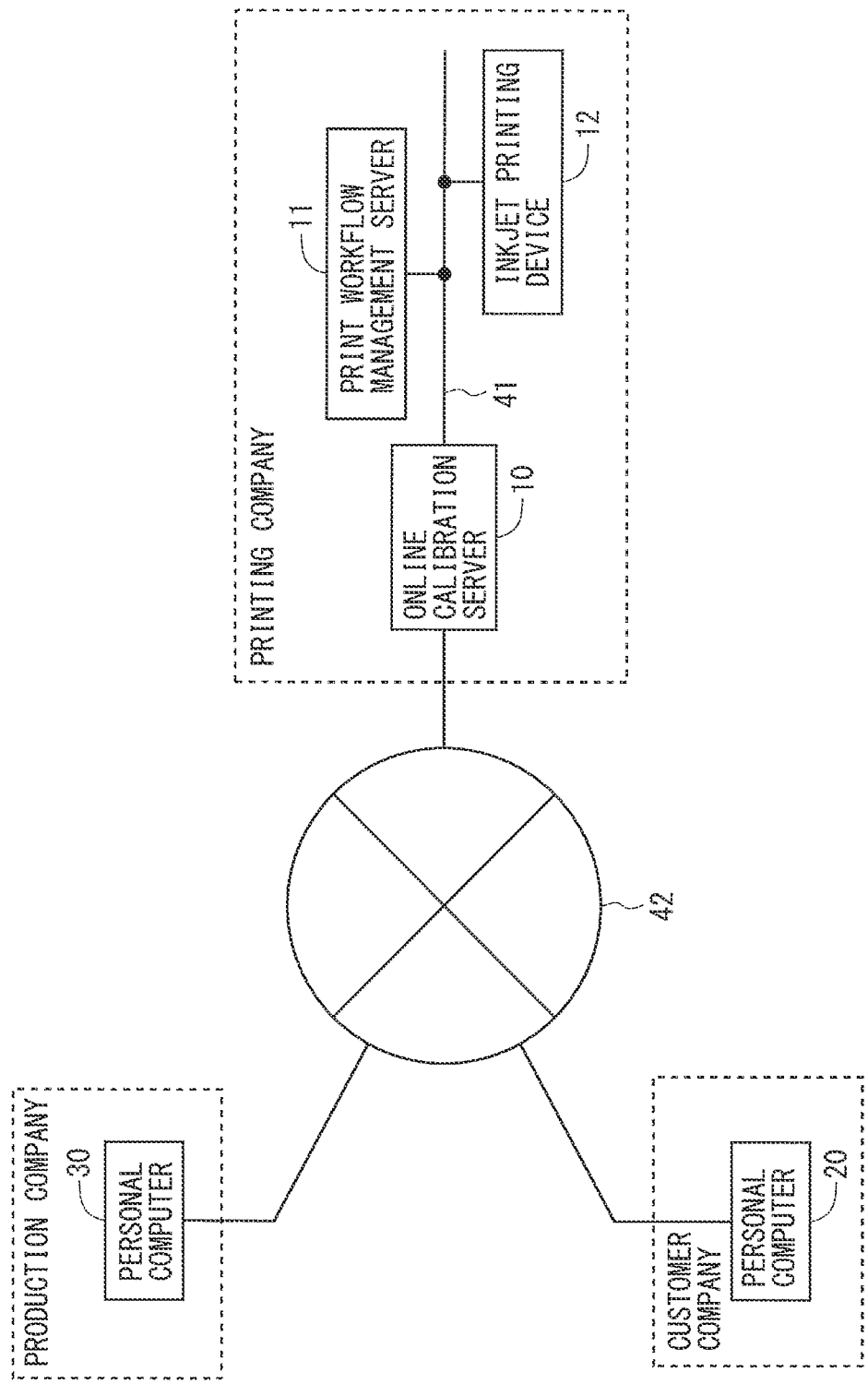
FIG. 1 is a block diagram illustrating an overall configuration of a printing system according to an embodiment of the present invention.

FIG. 1 is a block diagram illustrating an overall configuration of a printing system according to an embodiment of the present invention; This printing system includes an online calibration server 10, a print workflow management server 11, an inkjet printing device 12, a personal computer 20, and a personal computer 30. The online calibration server 10, the print workflow management server 11, and the inkjet printing device 12 are installed in a printing company. The personal computer 20 is installed in a customer company. The personal computer 30 is installed in a production company. The online calibration server 10, the print workflow management server 11, and the inkjet printing device 12 are connected by a LAN 41 in the printing company. The online calibration server 10, the personal computer 20, and the personal computer 30 are connected via Internet 42.

The personal computer 20 installed in the customer company is used to place a printing order and issue instructions for correction at the time of calibration work. The personal computer 30 installed in the production company is used to create a document according to contents of the order (create submission data for printing) and correct the document at the time of calibration work.

In response to a request from a personal computer (the personal computer 20 installed in the customer company or the personal computer 30 installed in the production company) via the Internet 42, the online calibration server 10 displays a screen for calibration work on a display unit of the personal computer, transmits and receives data to and from the personal computer, etc. The online calibration server 10 also performs image comparison processing for plate inspection. The image used for plate inspection is an image obtained by performing RIP processing on data sent to the online calibration server 10 from the personal computer 30. Note that, in the present embodiment, it is assumed that the RIP processing is also performed by the online calibration server 10. However, the RIP processing may be performed by the print workflow management server 11 or another personal computer (not illustrated) installed in the printing company.

Data of a print job for which the calibration work has been completed and approval by an approver of the customer company has been obtained is given to the print workflow management server 11. In the print workflow management server 11, a program for realizing a print workflow system that manages a series of processes for performing printing using the inkjet printing device 12 is installed. That is, the print workflow management server 11 manages a print workflow. For example, a process of determining an order of printing of a plurality of print jobs so that printing can be performed efficiently.

The inkjet printing device 12 outputs a print image (that is, performs printing) by ejecting an ink onto printing paper as a base material without using a printing plate, based on print data generated by the RIP processing.

Note that, although the online calibration server 10 functions as an image comparison device (a device that performs image comparison processing described later) in the present embodiment, the present invention is not limited thereto. The personal computer 20 installed in the customer company or the personal computer 30 installed in the production company may function as the image comparison device.

2. Hardware Configuration of Online Calibration Server

Figure 2:
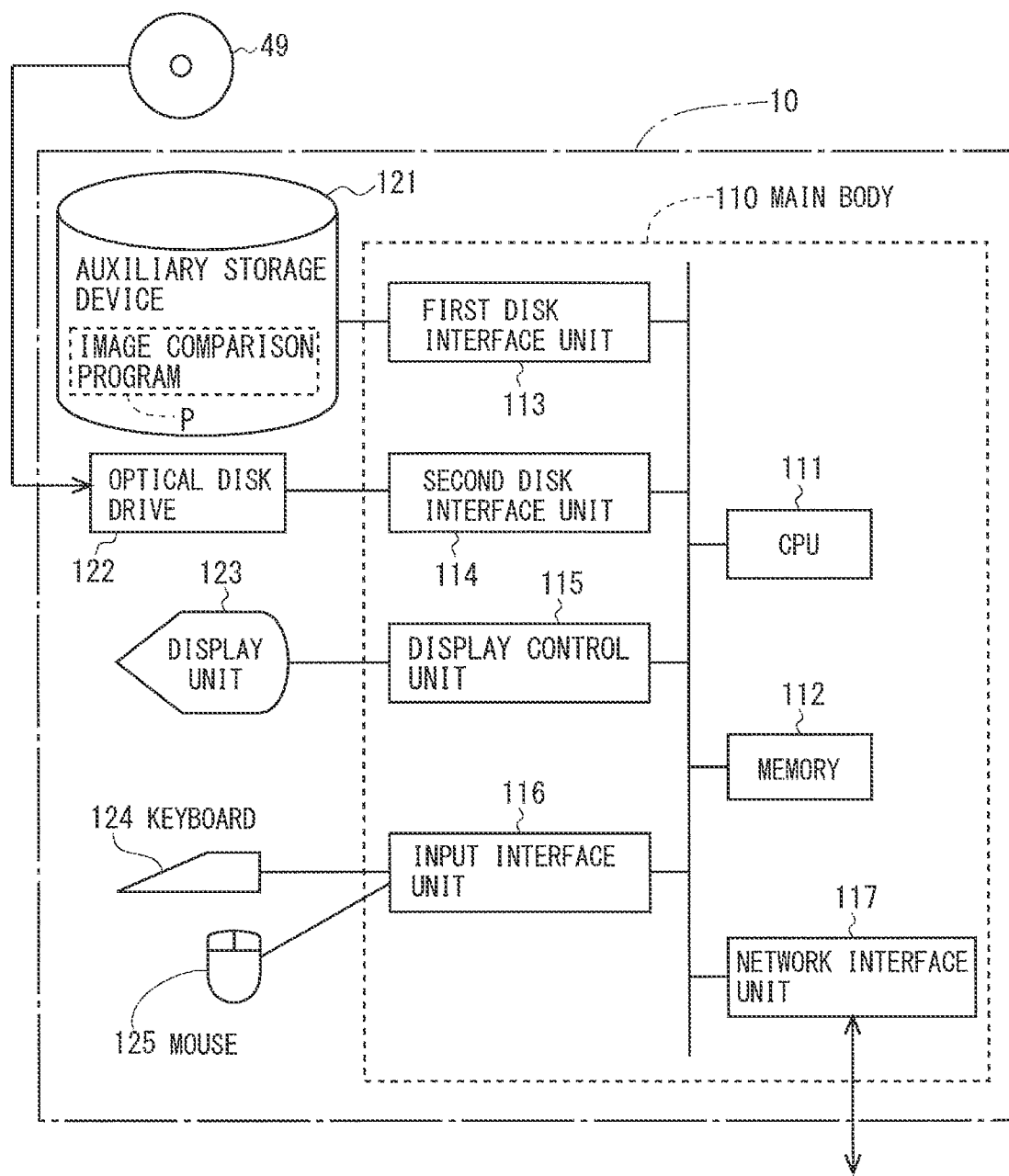
FIG. 2 is a block diagram illustrating a hardware configuration of an online calibration server functioning as an image comparison device in the embodiment.

FIG. 2 is a block diagram illustrating a hardware configuration of the online calibration server 10 functioning as the image comparison device in the present embodiment. The online calibration server 10 includes a main body 110, an auxiliary storage device 121, an optical disk drive 122, a display unit 123, a keyboard 124, a mouse 125, and the like. The main body 110 includes a CPU 111, a memory 112, a first disk interface unit 113, a second disk interface unit 114, a display control unit 115, an input interface unit 116, and a network interface unit 117. The CPU 111, the memory 112, the first disk interface unit 113, the second disk interface unit 114, the display control unit 115, the input interface unit 116, and the network interface unit 117 are connected to each other via a system bus. The auxiliary storage device 121 is connected to the first disk interface unit 113. The auxiliary storage device 121 is a magnetic disk device or the like. The optical disk drive 122 is connected to the second disk interface unit 114. An optical disk 49 as a computer-readable recording medium such as a CD-ROM, a DVD-ROM, or the like is inserted into the optical disk drive 122. The display unit (display device) 123 is connected to the display control unit 115. The display unit 123 is a liquid crystal display or the like. The display unit 123 is used to display information desired by an operator. The keyboard 124 and the mouse 125 are connected to the input interface unit 116. The keyboard 124 and the mouse 125 are used by the operator to input an instruction to the online calibration server 10. The network interface unit 117 is an interface circuit for communication.

The auxiliary storage device 121 stores an image comparison program P, other programs, and various data. The CPU 111 reads the image comparison program P stored in the auxiliary storage device 121 into the memory 112 and executes the image comparison program P to implement various functions for the image comparison processing to be described later. The memory 112 includes a RAM and a ROM. The memory 112 functions as a work area for the CPU 111 to execute the image comparison program P stored in the auxiliary storage device 121. Note that the image comparison program P is provided by being stored in a computer-readable recording medium (non-transitory recording medium). That is, for example, the user purchases the optical disk 49 as a recording medium of the image comparison program P and inserts the optical disk into the optical disk drive 122, and the image comparison program P is read from the optical disk 49 and installed in the auxiliary storage device 121. Alternatively, the image comparison program P transmitted via the network may be received by the network interface unit 117 and installed in the auxiliary storage device 121.

3. Image Comparison Processing 3.1 Premise

Figure 3:
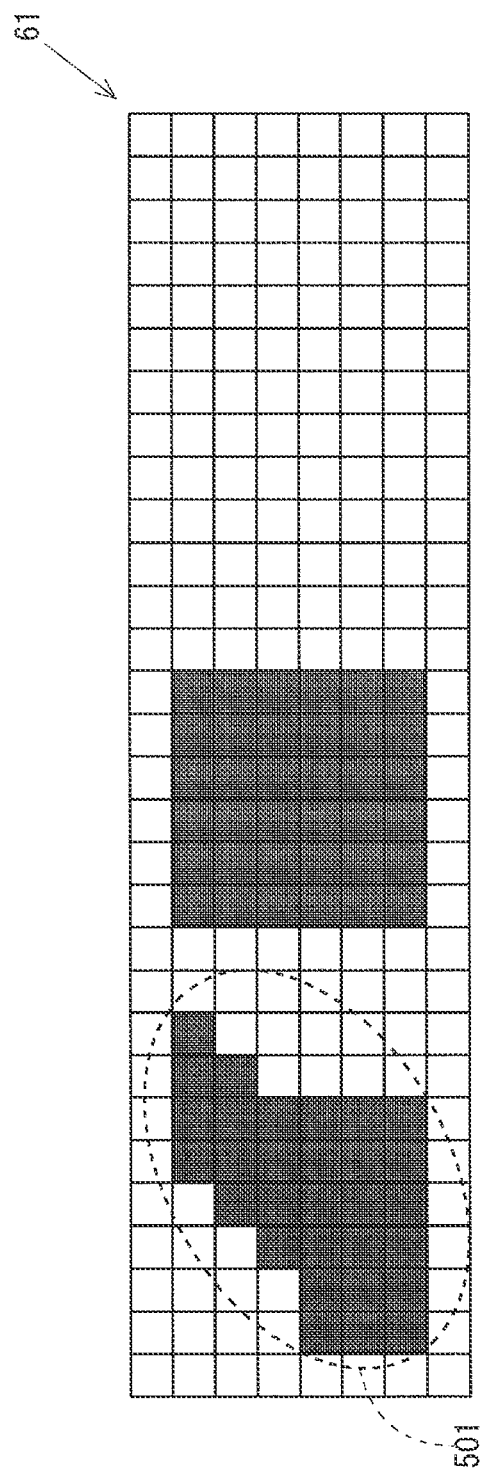
FIG. 3 is a diagram illustrating an example of an original image to be subjected to image comparison processing in the embodiment.
Figure 4:
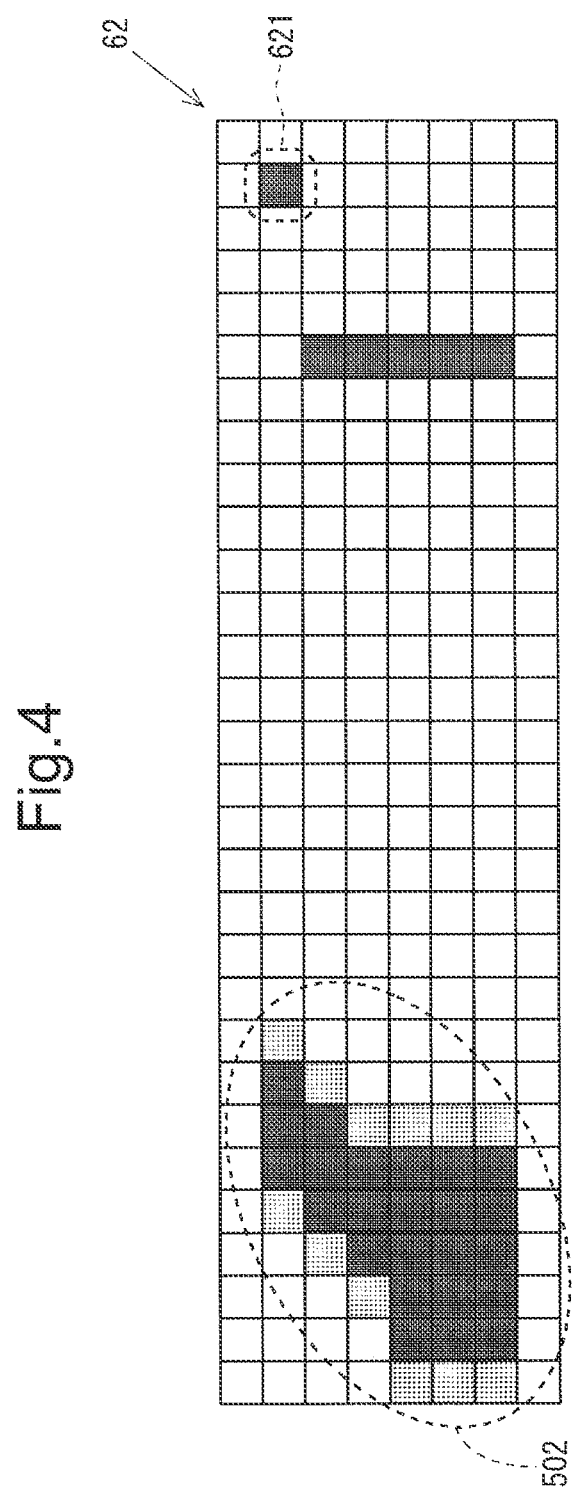
FIG. 4 is a diagram illustrating an example of a calibration image to be subjected to the image comparison processing in the embodiment.

The image comparison processing in the present embodiment will be described. The present specification focuses on a case where the online calibration server 10 compares an image based on data sent to the online calibration server 10 from the personal computer 30 before the calibration work is performed with an image based on data sent to the online calibration server 10 from the personal computer 30 after the calibration work is performed. In the following description, the image based on the data sent to the online calibration server 10 from the personal computer 30 before the calibration work is performed is referred to as "original image", and the image based on the data sent to the online calibration server 10 from the personal computer 30 after the calibration work is performed is referred to as "calibration image". The original image is denoted by reference numeral 61, and the calibration image is denoted by reference numeral 62. Furthermore, in the example described below, it is assumed that the original image 61 is an image as illustrated in FIG. 3 and the calibration image 62 is an image as illustrated in FIG. 4. In FIGS. 3 and 4, one rectangle represents one pixel. An image of a portion denoted by a reference numeral 502 in FIG. 4 is an image obtained by moving an image of a portion denoted by a reference numeral 501 in FIG. 3 leftward by 0.5 pixels due to the above-described quantization error. A pixel value of a pixel to which pale shading is applied in FIG. 4 is smaller than a pixel value of a pixel to which dark shading is applied in FIG. 4.

3.2 Functional Configuration for Image Comparison Processing

Figure 5:
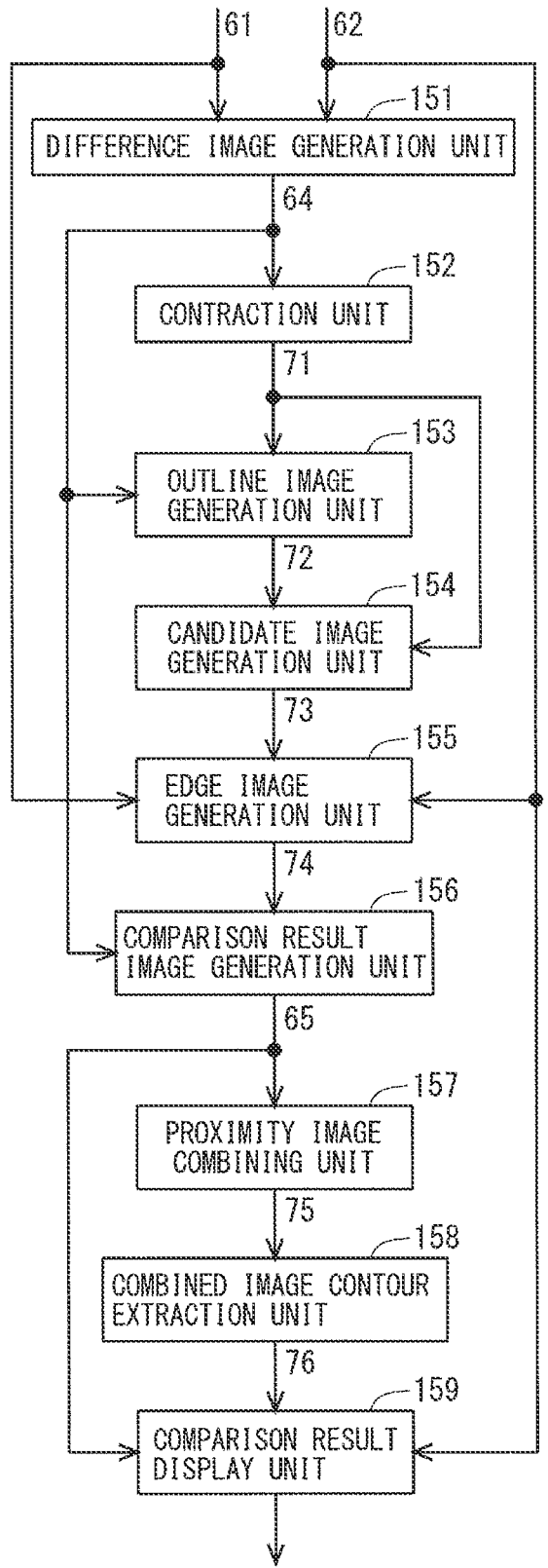
FIG. 5 is a block diagram illustrating a functional configuration for the image comparison processing in the embodiment.

FIG. 5 is a block diagram illustrating a functional configuration for the image comparison processing. Note that the functional configuration illustrated in FIG. 5 is realized by executing the image comparison program P in the online calibration server 10. As illustrated in FIG. 5, the online calibration server 10 includes, as functional components for executing the image comparison processing, a difference image generation unit 151, a contraction unit 152, an outline image generation unit 153, a candidate image generation unit 154, an edge image generation unit 155, a comparison result image generation unit 156, a proximity image combining unit 157, a combined image contour extraction unit 158, and a comparison result display unit 159. Hereinafter, an outline of operations of these components will be described.

The difference image generation unit 151 generates a difference image 64 that is a binary image representing a portion having a difference between the original image 61 and the calibration image 62. The difference image 64 generated by the difference image generation unit 151 typically includes one or more partial difference images. Each of the partial difference images includes one or more pixels.

The contraction unit 152 generates a contracted image 71 by performing contraction processing on each of one or more partial difference images included in the difference image 64 generated by the difference image generation unit 151. The contracted image 71 generated by the contraction unit 152 typically includes one or more partial contracted images. Each of the partial contracted images includes one or more pixels.

The outline image generation unit 153 removes the contracted image 71 from the difference image 64 to generate an outline image 72 corresponding to a contour of the difference image 64. More specifically, the outline image generation unit 153 generates the outline image 72 by removing one or more partial contracted images obtained by the contraction processing by the contraction unit 152 from one or more partial difference images included in the difference image 64. The outline image 72 generated by the outline image generation unit 153 typically includes one or more partial outline images. Each of the partial outline images includes one or more pixels.

The candidate image generation unit 154 generates a candidate image 73 representing a candidate portion of an edge region by removing the partial outline image adjacent to the partial contracted image generated by the contraction processing by the contraction unit 152 from the one or more partial outline images included in the outline image 72.

The edge image generation unit 155 generates an edge image representing an actual edge region from the candidate image 73 based on the original image 61, the calibration image 62, and the candidate image 73. In this regard, the edge image generation unit 155 assumes that one or more pixels constituting the one or more partial candidate images included in the candidate image 73 are sequentially set as a processing target pixel and that the processing target pixel and eight pixels around the processing target pixel are set as nine comparison target pixels, and determines the processing target pixel to be a pixel constituting the edge region when a first condition is satisfied, the first condition being a condition in which a difference between a pixel value of at least one of the nine comparison target pixels in the original image 61 and a pixel value of the processing target pixel in the calibration image 62 is less than or equal to a predetermined threshold value (hereinafter, referred to as "first threshold value"), and a difference between a pixel value of at least one of the nine comparison target pixels in the calibration image 62 and a pixel value of the processing target pixel in the original image 61 is less than or equal to the first threshold value.

The comparison result image generation unit 156 removes the edge image 74 generated by the edge image generation unit 155 from the difference image 64 to generate the comparison result image 65 representing a portion finally determined to have a difference between the original image 61 and the calibration image 62. The comparison result image 65 generated by the comparison result image generation unit 156 typically includes a plurality of partial difference result images. Each of the partial difference result images includes one or more pixels.

Regarding the comparison result image 65, the proximity image combining unit 157 combines two or more partial difference result images that are close to each other as one combined image 75 by performing expansion processing. As a result, for example, images of a plurality of characters forms a single combined image 75.

The combined image contour extraction unit 158 removes an image obtained by applying the contraction processing to the combined image 75 from the combined image 75 to generate an image (hereinafter, for convenience, referred to as a "combined contour image") 76 representing a region corresponding to a contour of the combined image 75.

The comparison result display unit 159 refers to the calibration image 62 and the combined contour image 76, and displays the comparison result image 65 in a mode in which a portion determined to have a difference between the original image 61 and the calibration image 62 is colored.

3.3 Procedure of Image Comparison Processing

Figure 6:
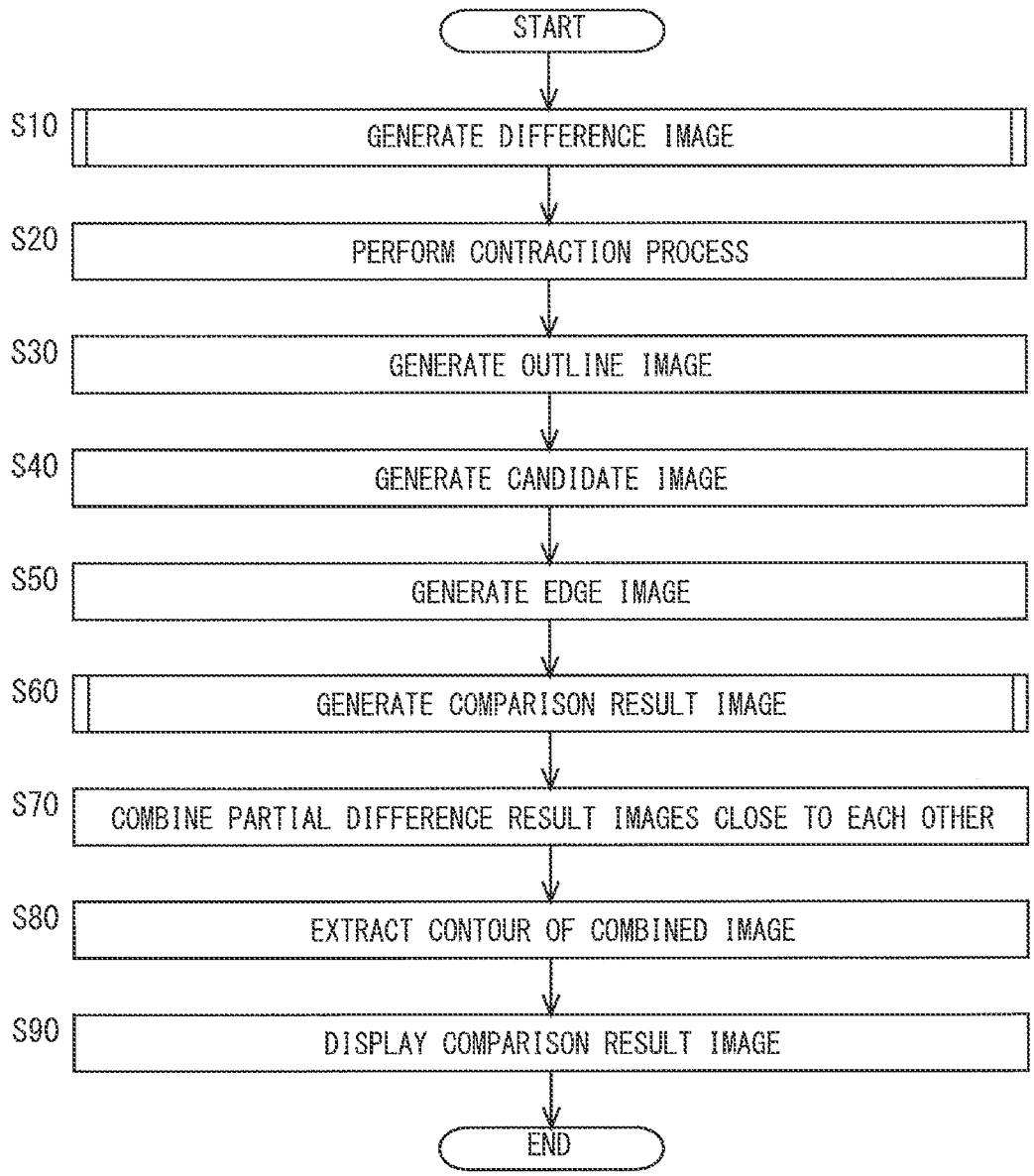
FIG. 6 is a flowchart showing a procedure of the image comparison processing in the embodiment.
Figure 7:
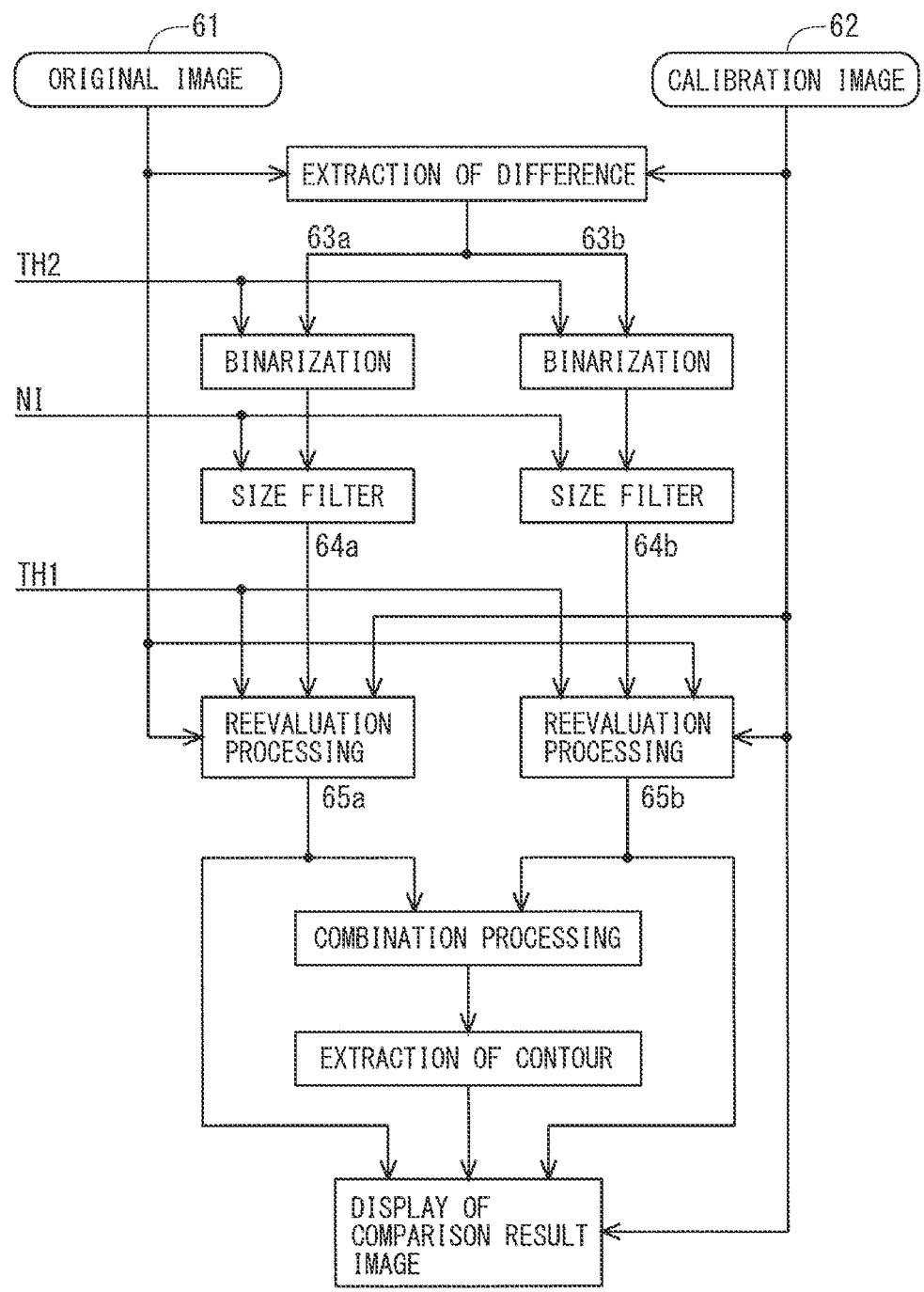
FIG. 7 is a diagram for illustration of an algorithm for the entire image comparison processing in the embodiment.
Figure 8:
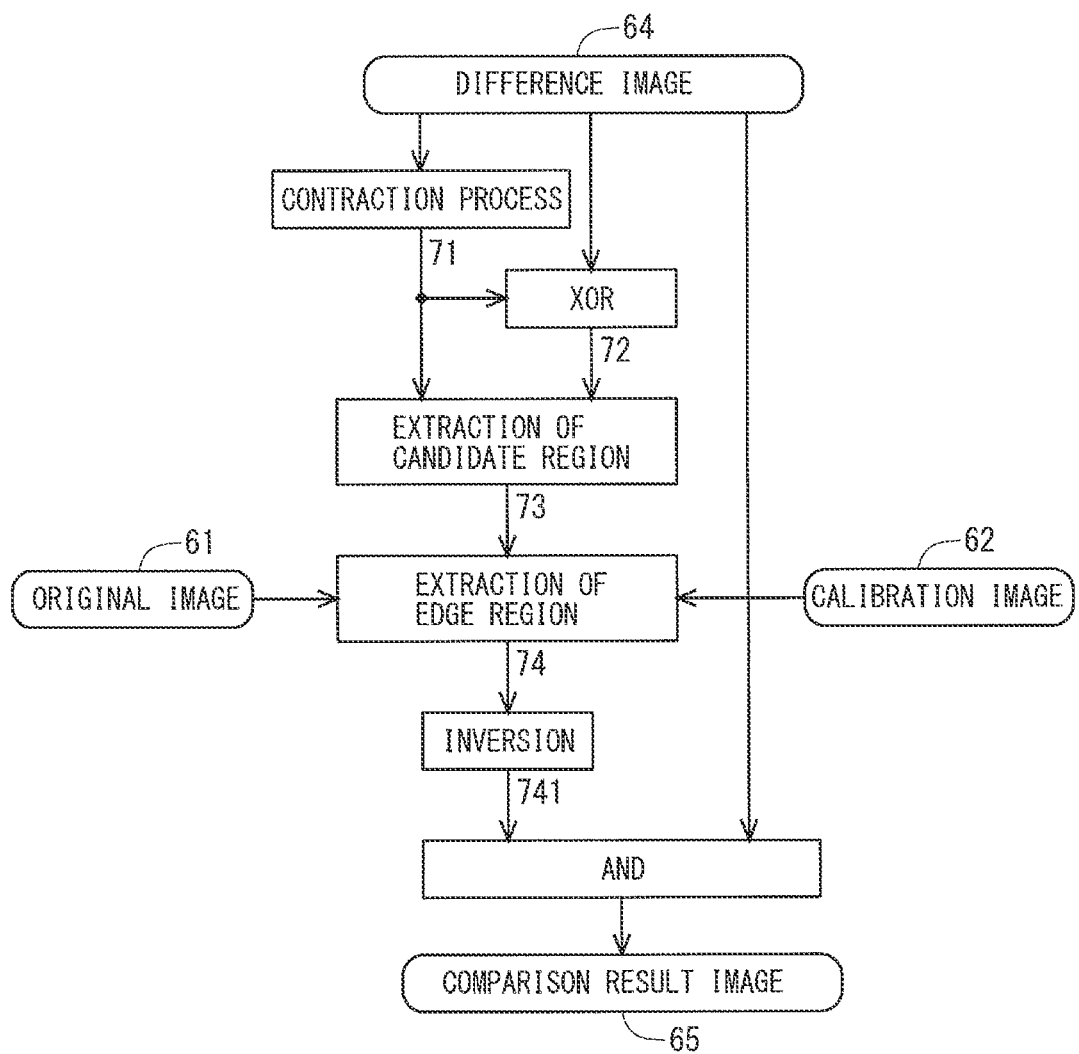
FIG. 8 is a diagram for illustration of an algorithm for a reevaluation processing that is processing performed by a contraction unit, an outline image generation unit, a candidate image generation unit, and an edge image generation unit in the image comparison processing in the embodiment.

FIG. 6 is a flowchart showing a procedure of the image comparison processing. FIG. 7 is a diagram for illustration of an algorithm for the entire image comparison processing. FIG. 8 is a diagram for illustration of an algorithm for reevaluation processing that is processing performed by the contraction unit 152, the outline image generation unit 153, the candidate image generation unit 154, and the edge image generation unit 155 in the image comparison processing. A procedure of the image comparison processing (image comparison method) in the present embodiment will be described in detail with reference to these.

When the image comparison processing is started, first, the difference image generation unit 151 generates the difference image 64, which is a binary image representing a portion having a difference between the original image 61 and the calibration image 62 (step S10).

Figure 9:
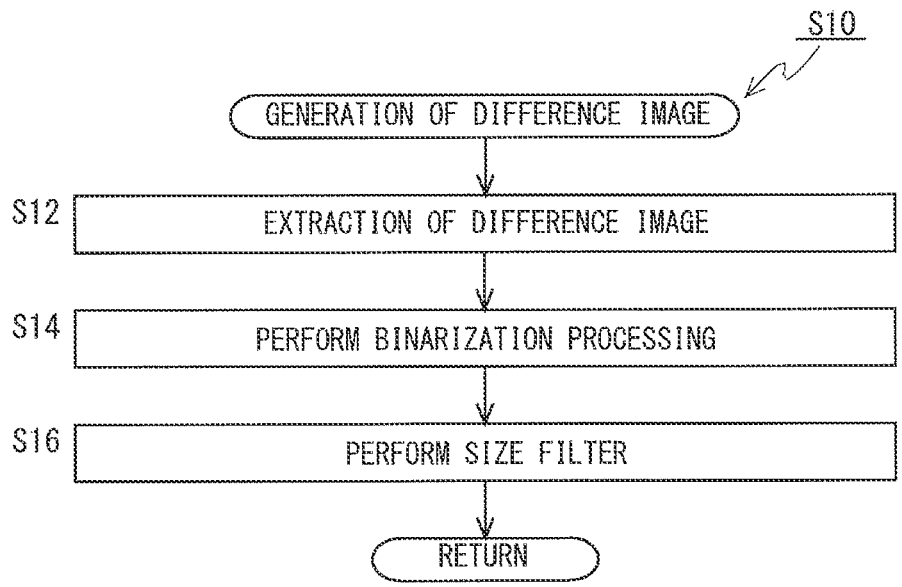
FIG. 9 is a flowchart showing a detailed procedure of processing in step S10 of FIG. 6 (processing of generating a difference image) in the embodiment.

FIG. 9 is a flowchart showing a detailed procedure of the processing in step S10 (processing of generating the difference image 64). In step S10, first, the original image 61 and the calibration image 62 are compared pixel by pixel, and pixels having difference pixel values (difference pixels) are extracted (step S12). That is, the difference between the original image 61 and the calibration image 62 is extracted. Data of the extracted pixel is multi-valued data. Meanwhile, when a difference is detected for any pixel, a pixel value in the calibration image 62 may be larger than a pixel value in the original image 61, or a pixel value in the original image 61 may be larger than a pixel value in the calibration image 62. Therefore, in the present embodiment, an image based on a set of pixels having a larger pixel value in the calibration image 62 than in the original image 61 is treated as a positive difference multi-valued image 63a, and an image based on a set of pixels having a larger pixel value in the original image 61 than in the calibration image 62 is treated as a negative difference multi-valued image 63b (see FIG. 7).

After the positive difference multi-valued image 63a and the negative difference multi-valued image 63b are obtained, binarization processing is performed on each of the positive difference multi-valued image 63a and the negative difference multi-valued image 63b (step S14). In the binarization processing, an absolute value of the difference of each pixel is compared with a predetermined threshold value (hereinafter, referred to as "second threshold value") TH2. Then, a value after the binarization processing is set to 1 for a pixel in which the absolute value of the difference is greater than or equal to the second threshold value TH2, and a value after the binarization processing is set to 0 for a pixel in which the absolute value of the difference is less than the second threshold value TH2. As above, for the pixel in which the difference between the pixel value in the original image 61 and the pixel value in the calibration image 62 is greater than or equal to the second threshold value TH2 among the difference pixels extracted in step S12, it is regarded that there is a difference between the original image 61 and the calibration image 62, and for the pixel in which the difference between the pixel value in the original image 61 and the pixel value in the calibration image 62 is less than the second threshold value TH2 among the difference pixels extracted in step S12, it is regarded that there is no difference between the original image 61 and the calibration image 62.

Figure 10:
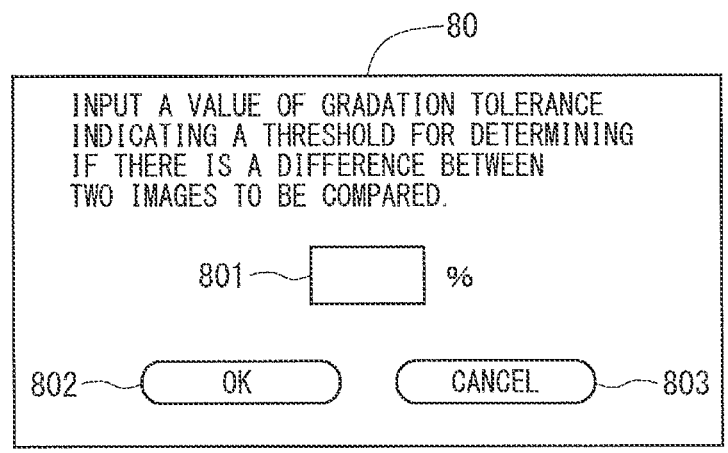
FIG. 10 is a diagram illustrating an example of a gradation tolerance input screen in the embodiment.

Meanwhile, the second threshold value TH2 can be set by the user in advance. However, in the present embodiment, the user does not directly designate the second threshold value TH2, but designates a percentage (%) corresponding to the second threshold value TH2. Hereinafter, the percentage designated by the user is referred to as "gradation tolerance". FIG. 10 is a diagram illustrating an example of a gradation tolerance input screen 80 by which the user inputs a gradation tolerance. The gradation tolerance input screen 80 includes a text box 801 for inputting a value of the gradation tolerance, an OK button 802, and a cancel button 803. When the OK button 802 is pressed in a state where a value is inputted in the text box 801, the second threshold value TH2 is calculated. When the cancel button 803 is pressed, the second threshold value TH2 is not calculated, and the gradation tolerance input screen 80 is hidden. If the multi-valued data is 8-bit data, the second threshold value TH2 is calculated by the following equation (1) where a value (percentage) inputted to the text box 801 is represented by V.

$$TH2 = (V/100) \times 255 \tag{1}$$

Figure 11:
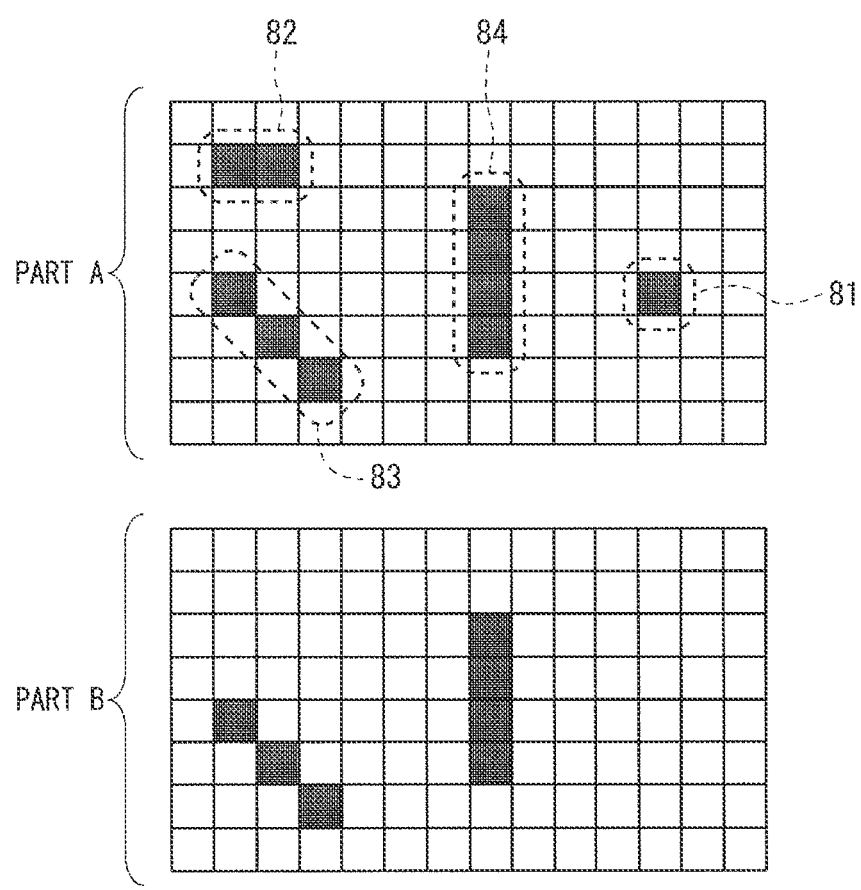
FIG. 11 is a diagram for illustration of a size filter in the embodiment.

After the end of the binarization processing, processing called "size filter" is performed to remove a partial difference image including pixels less than or equal to a predetermined isolation error number NI from the one or more partial difference images included in the binary image generated by the binarization processing (step S16). For example, it is assumed that the isolation error number NI is set to "2", and four partial difference images 81-84 are included in the binary image to be processed as illustrated in a part A of FIG. 11. In this case, since the partial difference image 81 includes one pixel and the partial difference image 82 includes two pixels, the partial difference image 81 and the partial difference image 82 are removed by the size filter. As a result, a difference image as illustrated in a part B of FIG. 11 is obtained. Note that the processing in step S16 is not essential, and a procedure in which the processing in step S16 is omitted can be adopted. However, by performing the processing in step S16, the occurrence of erroneous detection caused by various types of noise is suppressed.

Figure 12:
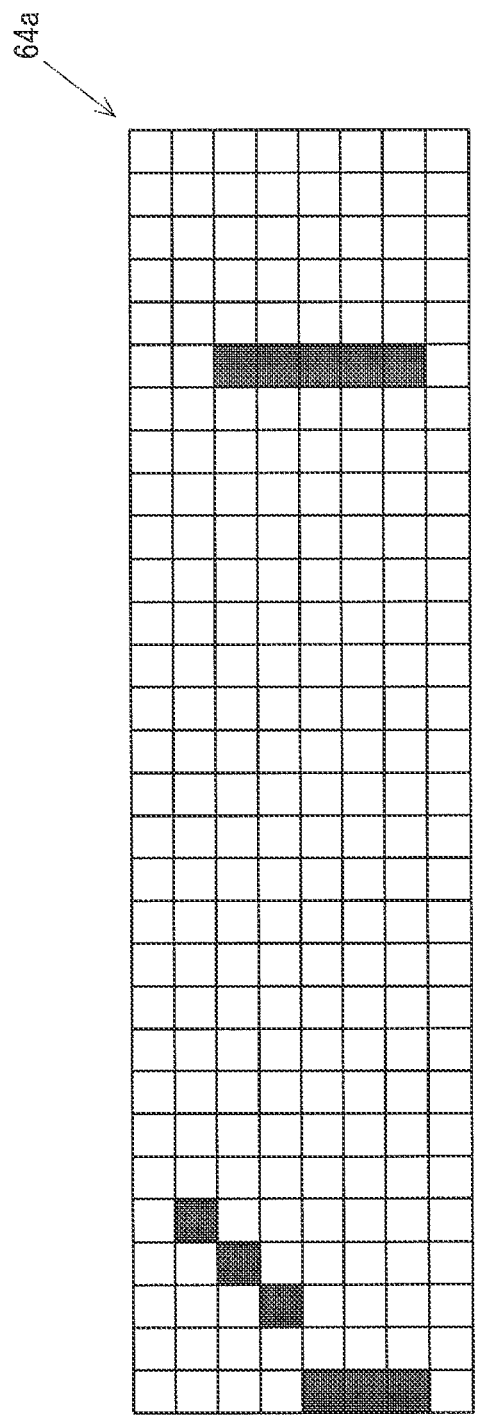
FIG. 12 is a diagram illustrating an example of a positive difference image generated by the processing in step S10 of FIG. 6 in the embodiment.
Figure 13:
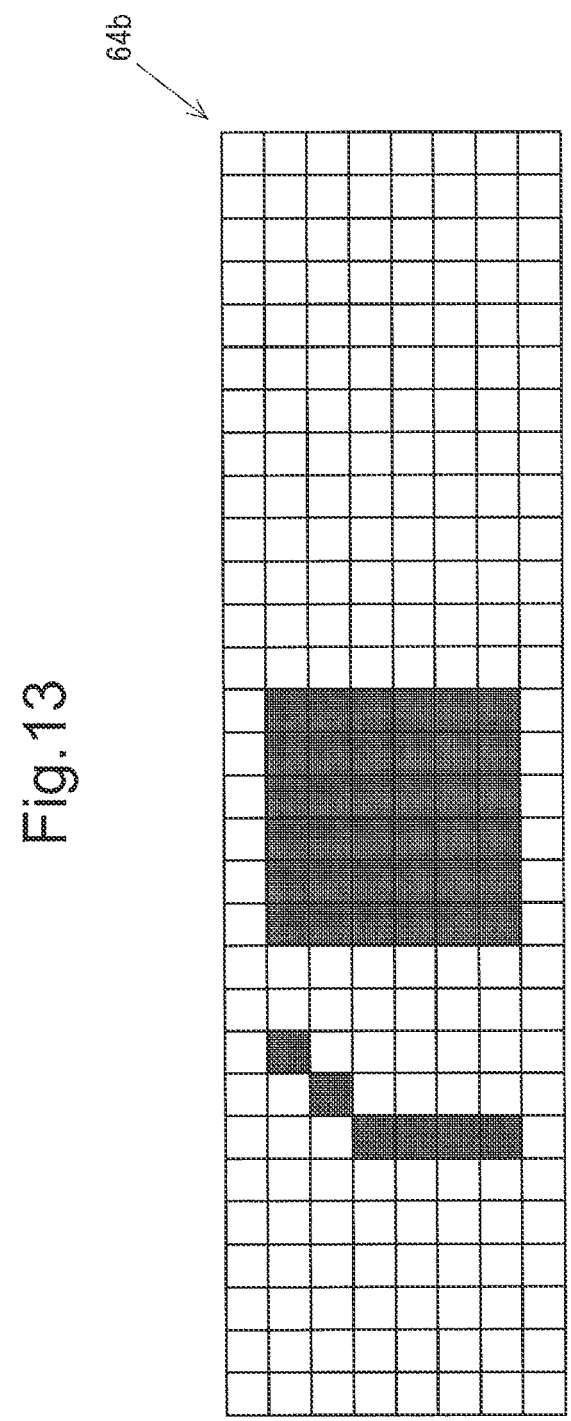
FIG. 13 is a diagram illustrating an example of a negative difference image generated by the processing in step S10 of FIG. 6 in the embodiment.

When the size filter ends, the processing in step S10 ends. As a result, in the case where the original image 61 is an image as illustrated in FIG. 3 as described above, the calibration image 62 is an image as illustrated in FIG. 4, and size filtering is performed in a state where the isolation error number NI is set to "1", an image as illustrated in FIG. 12 is obtained as the difference image (positive difference image 64a) corresponding to the positive difference multi-valued image 63a, and an image as illustrated in FIG. 13 is obtained as the difference image (negative difference image 64b) corresponding to the negative difference multi-valued image 63b. Here, an image of a portion denoted by reference numeral 621 in FIG. 4 is removed by the size filter.

Figure 14:
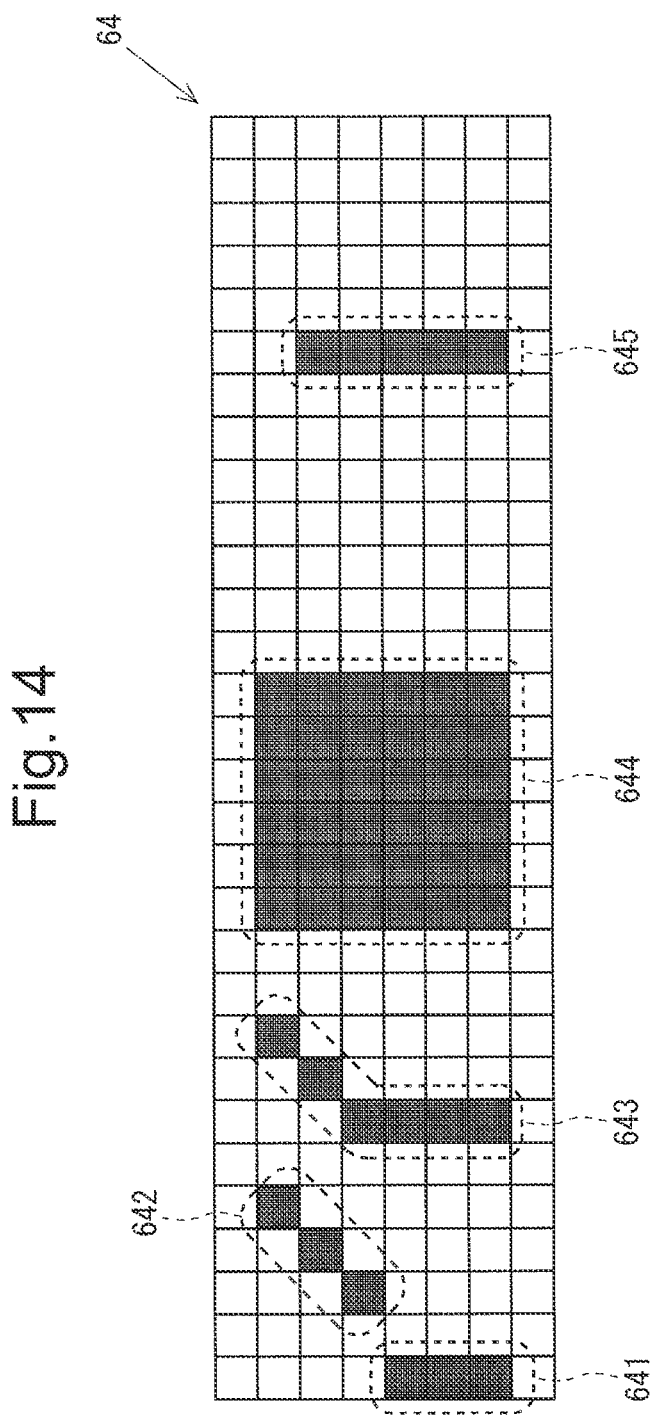
FIG. 14 is a diagram illustrating an example of a difference image in the embodiment.

Note that, as can be grasped from FIG. 7, the reevaluation processing (processing in steps S20 to S60 in FIG. 6) is also performed separately for the processing based on the positive difference image 64a and the processing based on the negative difference image 64b. However, hereinafter, a case where the reevaluation processing is performed based on the difference image 64 as illustrated in FIG. 14 will be described focusing on one of the processings.

Figure 15:
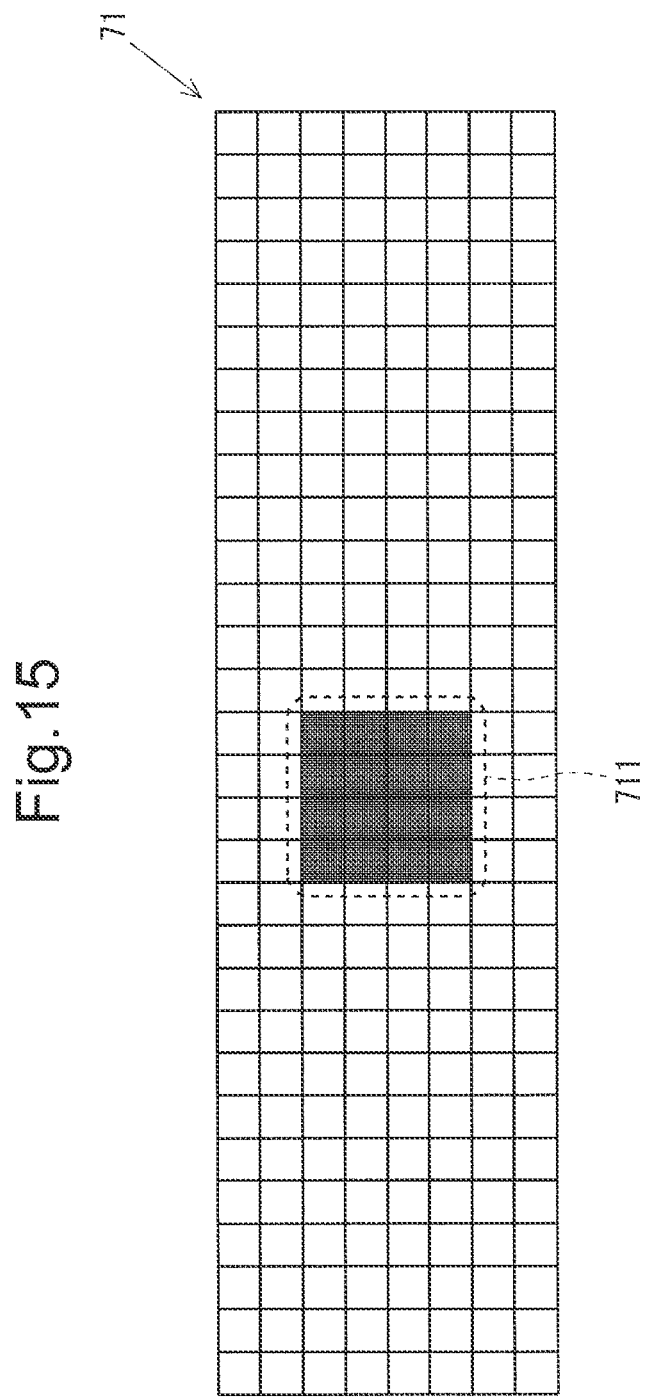
FIG. 15 is a diagram illustrating an example of a contracted image generated by processing in step S20 of FIG. 6 in the embodiment.

In step S20, the contraction unit 152 performs the contraction processing on each of one or more partial difference images included in the difference image 64 generated in step S10. In this example, the difference image 64 (see FIG. 14) includes five partial difference images 641-645, and the contraction processing with a contraction width of one pixel is performed on each of the five partial difference images 641-645. As a result, the contracted image 71 as illustrated in FIG. 15 is generated. The contracted image 71 shown in FIG. 15 includes one partial contracted image 711. The partial contracted image 711 is an image obtained by the contraction processing on a partial difference image 644 in FIG. 14.

Figure 16:
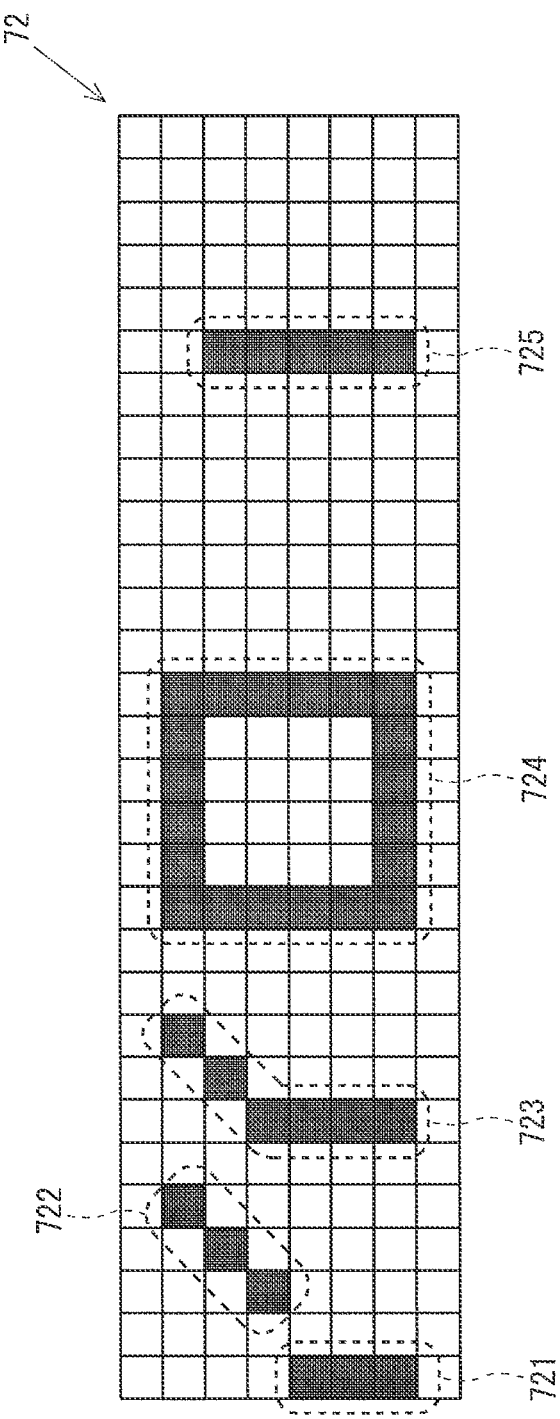
FIG. 16 is a diagram illustrating an example of an outline image generated by processing in step S30 of FIG. 6 in the embodiment.

After the contracted image 71 is generated, the outline image generation unit 153 removes the one or more partial contracted images generated in step S20 from the one or more partial difference images included in the difference image 64 to generate the outline image 72 (step S30). More specifically, the outline image 72 is generated by performing an exclusive OR (XOR) operation of the difference image 64 (see FIG. 14) and the contracted image 71 (see FIG. 15). In this example, the outline image 72 as illustrated in FIG. 16 is generated in step S30. The outline image 72 includes five partial outline images 721-725. The partial outline image 724 is an image obtained by removing the partial contracted image 711 illustrated in FIG. 15 from the partial difference image 644 in FIG. 14.

Figure 17:
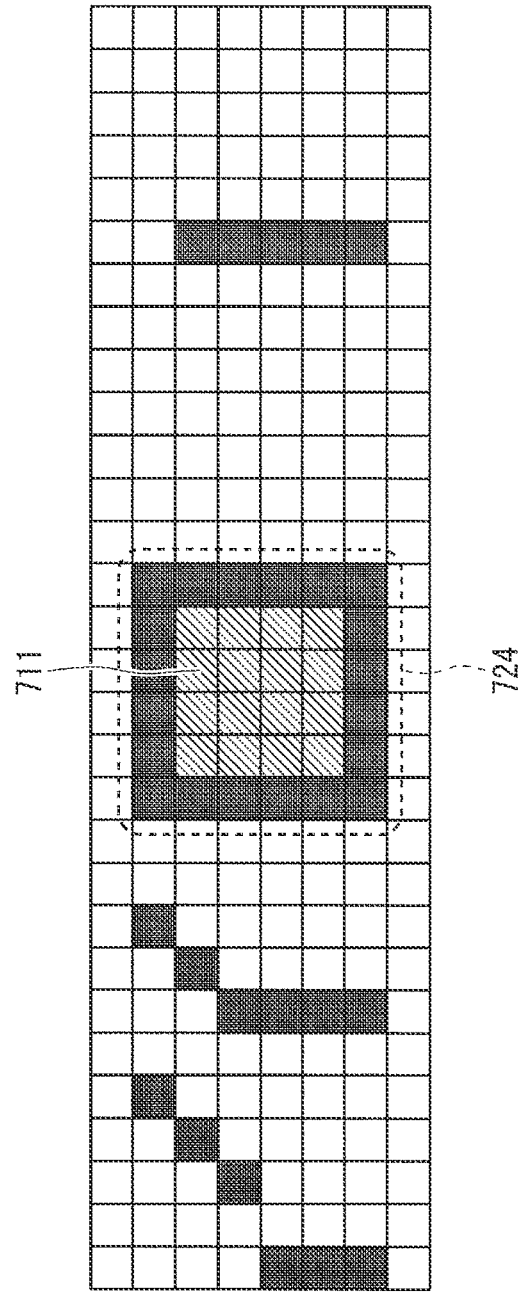
FIG. 17 is a diagram for illustration of generation of a candidate image in the embodiment.
Figure 18:
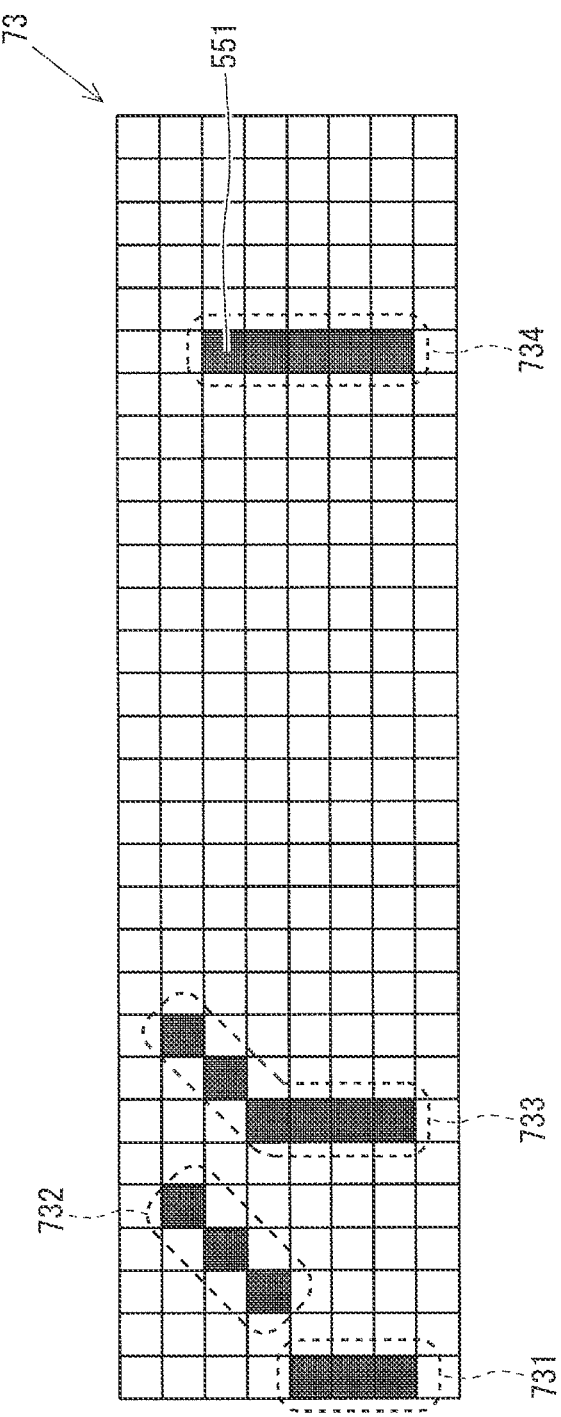
FIG. 18 is a diagram illustrating an example of the candidate image generated by processing in step S40 of FIG. 6 in the embodiment.

After the outline image 72 is generated, the candidate image generation unit 154 generates the candidate image 73 by removing the partial outline image adjacent to the partial contracted image generated in step S20 from the one or more partial outline images included in the outline image 72 (step S40). In this regard, when the partial contracted image 711 illustrated in FIG. 15 is represented by hatching, the relationship between the partial contracted image 711 and the partial outline image 724 in FIG. 16 is as illustrated in FIG. 17. As can be grasped from FIG. 17, the partial outline image 724 is in contact with the partial contracted image 711. Therefore, in step S40, the partial outline image 724 is removed from the outline image 72. As a result, the candidate image 73 as illustrated in FIG. 18 is generated. In this example, the candidate image 73 includes four partial candidate images 731-734.

After the candidate image 73 is generated, the edge image generation unit 155 generates the edge image 74 representing the edge region (step S50). In step S50, one or more pixels constituting one or more partial candidate images included in the candidate image 73 generated in step S40 are sequentially set as the processing target pixel, and if the above-described first condition is satisfied, the processing target pixel is determined to be a pixel constituting an edge region. Step S50 will be specifically described with reference to FIGS. 19 to 24.

Figure 19:
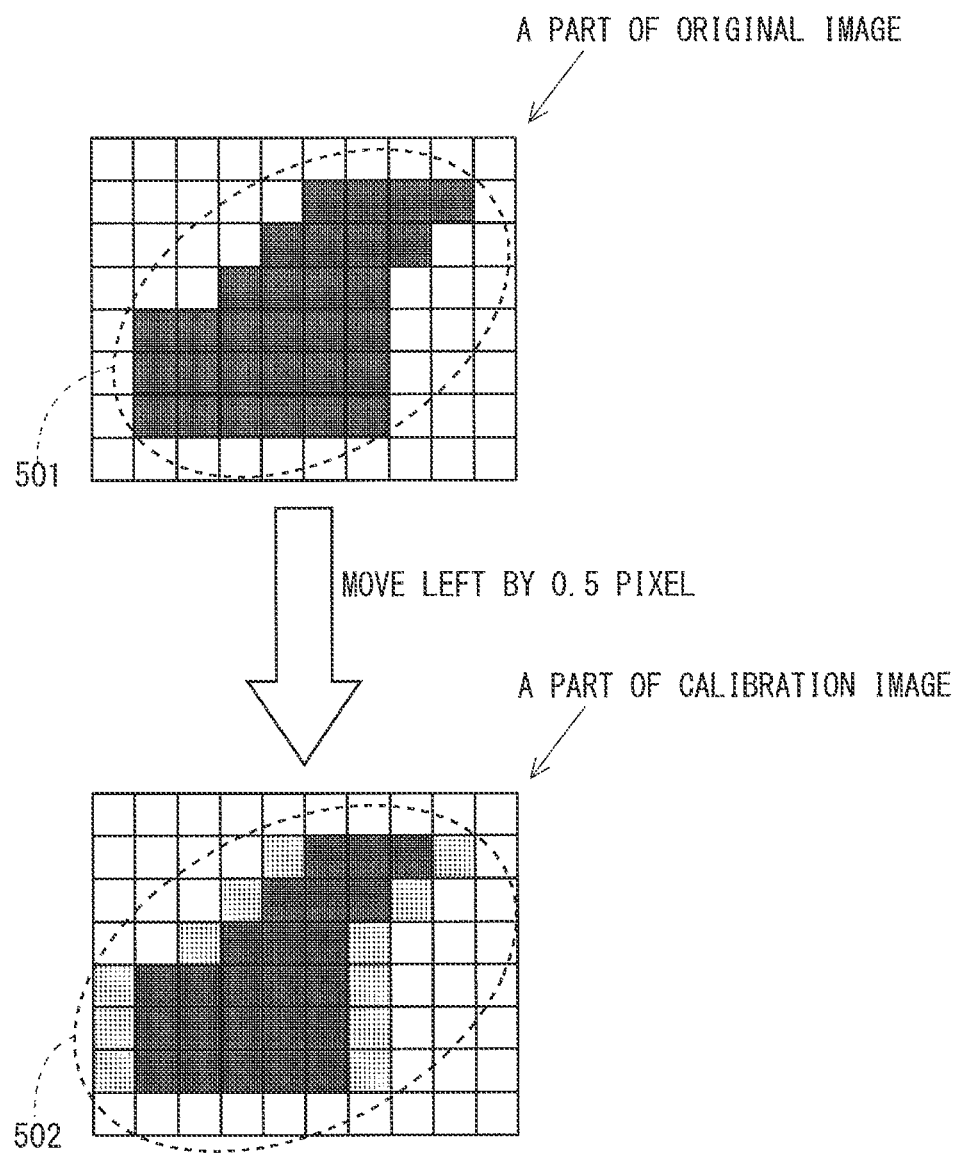
FIG. 19 is a diagram for illustration of generation of an edge image in the embodiment.
Figure 20:
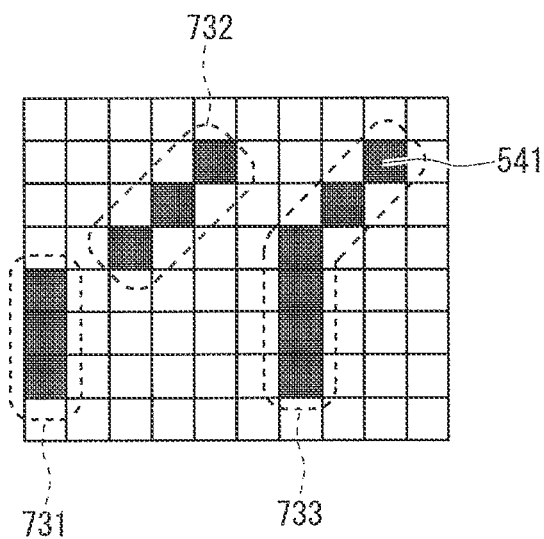
FIG. 20 is a diagram for illustration of generation of an edge image in the embodiment.
Figure 21:
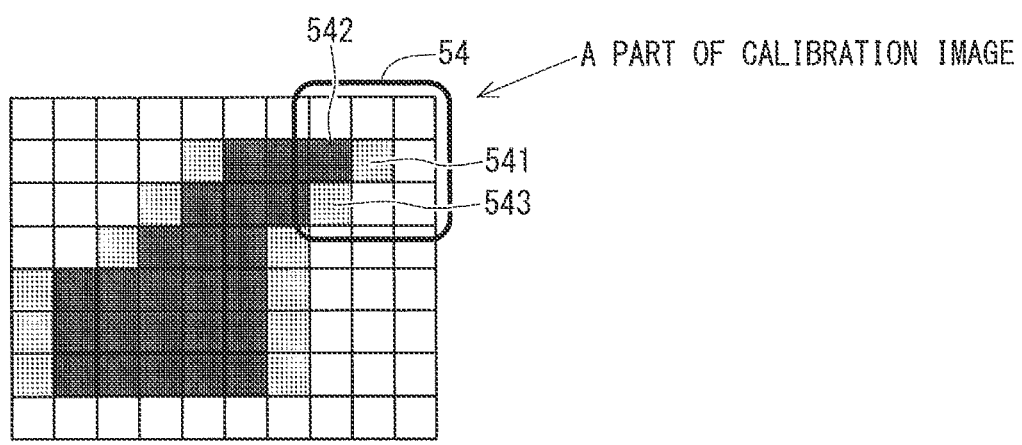
FIG. 21 is a diagram for illustration of generation of an edge image in the embodiment.

As described above, the image of the portion denoted by the reference numeral 502 in FIG. 4 is an image obtained by moving the image of the portion denoted by the reference numeral 501 in FIG. 3 leftward by 0.5 pixels due to the quantization error. Therefore, the relationship between the image of the portion denoted by the reference numeral 502 in FIG. 4 and the image of the portion denoted by the reference numeral 501 in FIG. 3 is as illustrated in FIG. 19. Note that the candidate image 73 corresponding to the portion illustrated in FIG. 19 is as illustrated in FIG. 20. In step S50, one or more pixels constituting the partial candidate image included in the candidate image 73 are sequentially set as the processing target pixel. However, here, attention is paid to the operation when a pixel denoted by a reference numeral 541 in FIG. 20 is the processing target pixel. At this time, the processing target pixel 541 and eight pixels around the processing target pixel 541 are comparison target pixels. That is, nine pixels centered on the processing target pixel 541 are the comparison target pixels.

Figure 22:
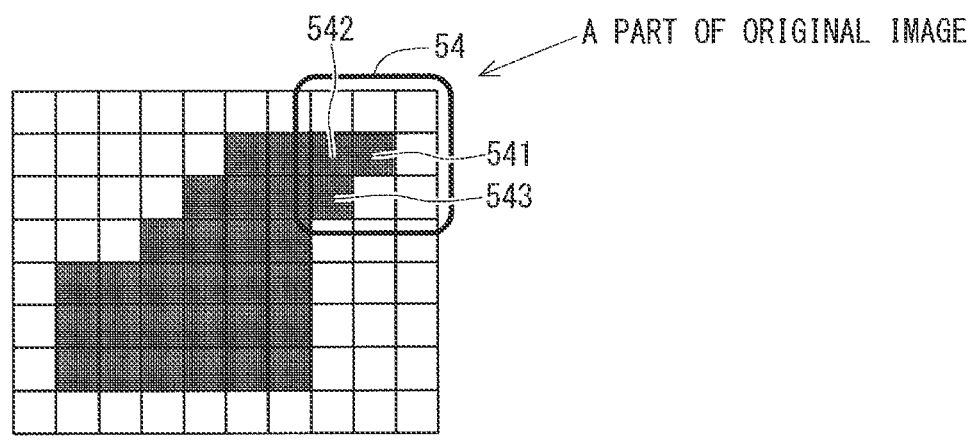
FIG. 22 is a diagram for illustration of generation of an edge image in the embodiment.

In this case, first, the pixel value of the processing target pixel 541 (see FIG. 21) in the calibration image 62 is sequentially compared with the pixel values of the nine comparison target pixels (nine pixels existing in a thick frame denoted by the reference numeral 54 in FIG. 22) in the original image 61. Then, it is determined whether or not the difference between the pixel value of at least one of the nine comparison target pixels in the original image 61 and the pixel value of the processing target pixel 541 in the calibration image 62 is less than or equal to the first threshold value TH1. Note that, in this example, it is assumed that determination is made that the difference between each of the pixel values of the three processing target pixels 541-543 in the original image 61 and the pixel value of the processing target pixel 541 in the calibration image 62 is less than or equal to the first threshold value TH1. Furthermore, the pixel value of the processing target pixel 541 (see FIG. 22) in the original image 61 is sequentially compared with the pixel values of the nine comparison target pixels (nine pixels existing in a thick frame denoted by the reference numeral 54 in FIG. 21) in the calibration image 62. Then, it is determined whether or not the difference between the pixel value of at least one of the nine comparison target pixels in the calibration image 62 and the pixel value of the processing target pixel 541 in the original image 61 is less than or equal to the first threshold value TH1. Note that, in this example, it is assumed that determination is made that the difference between each of the pixel values of the three processing target pixels 541-543 in the calibration image 62 and the pixel value of the processing target pixel 541 in the original image 61 is less than or equal to the first threshold value TH1. From the above, since the first condition is satisfied in this case, the processing target pixel 541 is determined to be a pixel constituting the edge region.

Next, attention is paid to an operation when a pixel denoted by a reference numeral 551 among the four pixels constituting the partial candidate image 734 illustrated in FIG. 18 is the processing target pixel. Note that the image in the vicinity of the processing target pixel 551 in the original image 61 is as illustrated in FIG. 23, and the image in the vicinity of the processing target pixel 551 in the calibration image 62 is as illustrated in FIG. 24.

Figure 23:
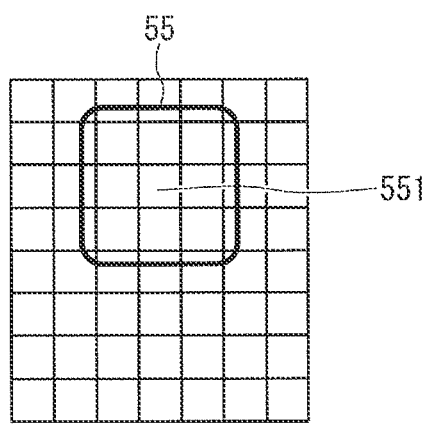
FIG. 23 is a diagram for illustration of generation of an edge image in the embodiment.
Figure 24:
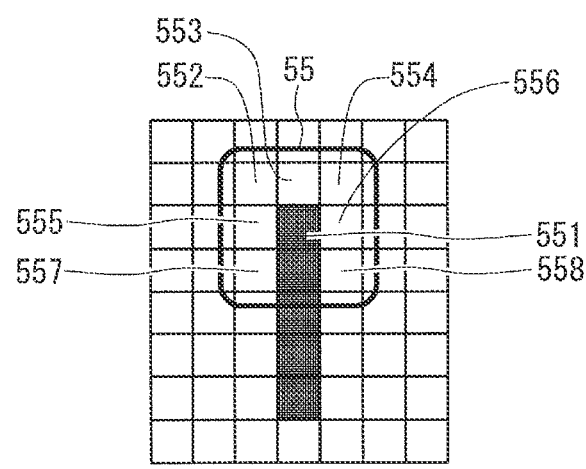
FIG. 24 is a diagram for illustration of generation of an edge image in the embodiment.

Also in this case, first, it is determined whether or not the difference between the pixel value of at least one of the nine comparison target pixels (nine pixels existing in the thick frame denoted by a reference numeral 55 in FIG. 23) in the original image 61 and the pixel value of the processing target pixel 551 in the calibration image 62 is less than or equal to the first threshold value TH1. Note that, in this example, it is assumed that it is determined that the difference between any pixel value of the nine comparison target pixels in the original image 61 and the pixel value of the processing target pixel 551 in the calibration image 62 is larger than the first threshold value TH1. Furthermore, it is determined whether or not the difference between the pixel value of at least one of the nine comparison target pixels (the nine pixels existing in the thick frame denoted by a reference numeral 55 in FIG. 24) in the calibration image 62 and the pixel value of the processing target pixel 551 in the original image 61 is less than or equal to the first threshold value TH1. Note that, in this example, it is assumed that determination is made that the difference between each of the pixel values of the seven comparison target pixels 552-558 in the calibration image 62 and the pixel value of the processing target pixel 551 in the original image 61 is less than or equal to the first threshold value TH1. From the above, since the first condition is not satisfied in this case, it is determined that the processing target pixel 551 is not a pixel constituting the edge region.

Figure 25:
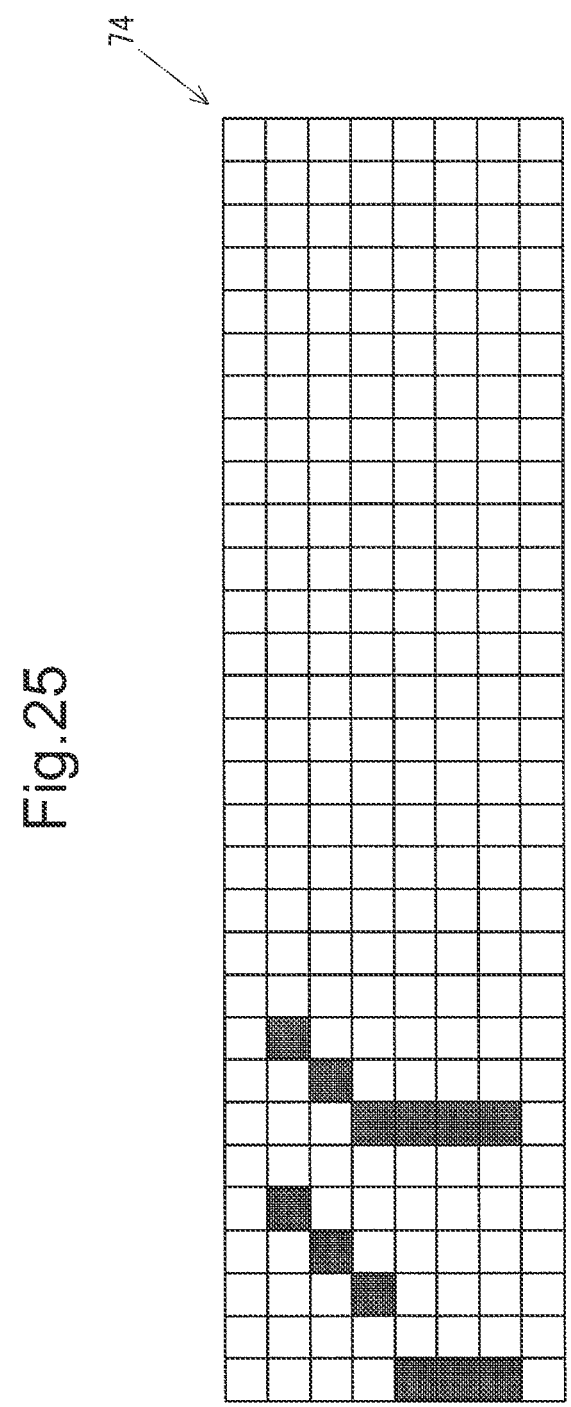
FIG. 25 is a diagram illustrating an example of the edge image generated by processing in step S50 of FIG. 6 in the embodiment.

In the above manner, in step S50, an image as illustrated in FIG. 25 is generated as the edge image 74 representing the edge region.

Thereafter, the comparison result image generation unit 156 generates the comparison result image 65 by removing the edge image 74 generated in step S50 from the difference image 64 (step S60).

Figure 26:
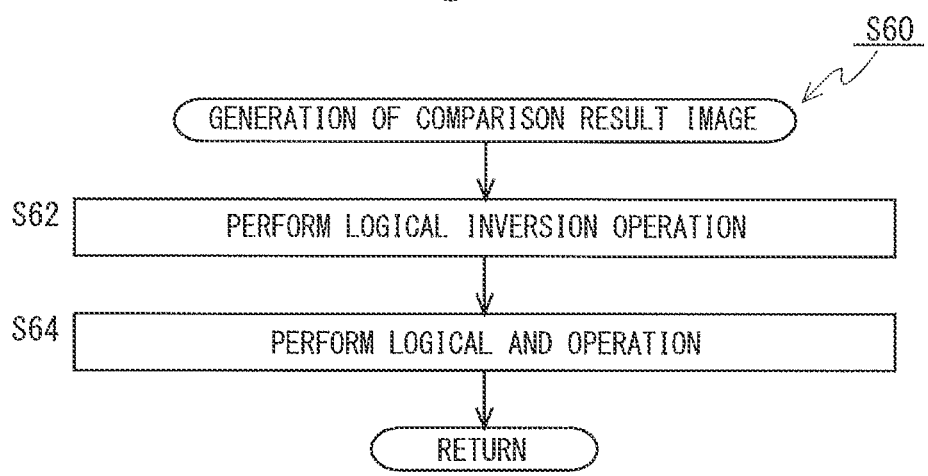
FIG. 26 is a flowchart showing a detailed procedure of processing in step S60 of FIG. 6 (processing of generating a comparison result image) in the embodiment.
Figure 27:
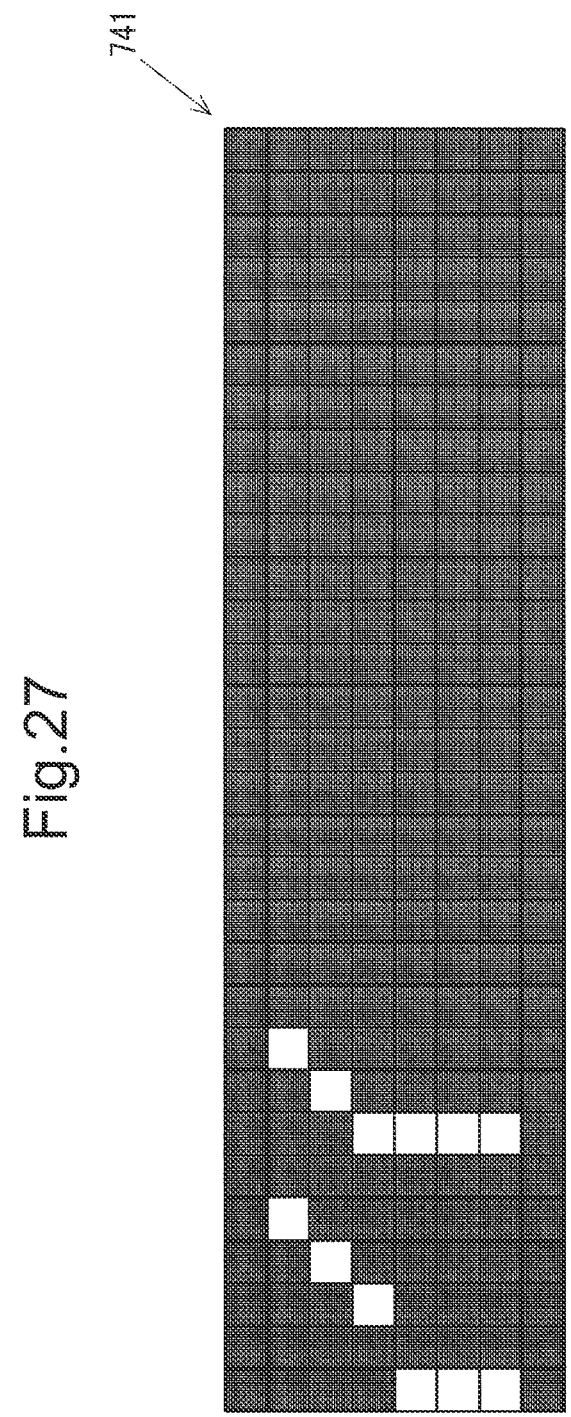
FIG. 27 is a diagram illustrating an example of an edge inversion image generated by processing in step S62 of FIG. 26 in the embodiment.
Figure 28:
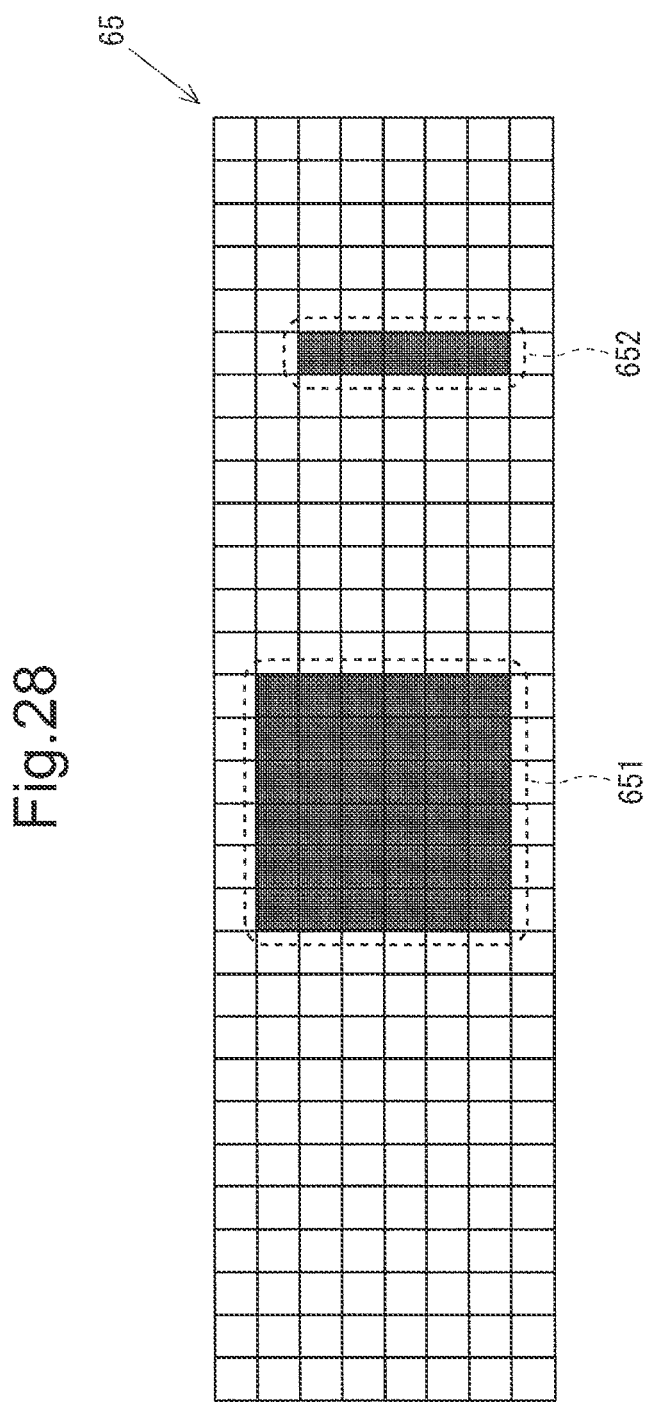
FIG. 28 is a diagram illustrating an example of a comparison result image generated by processing in step S64 in FIG. 26 in the embodiment.

FIG. 26 is a flowchart showing a detailed procedure of the processing in step S60 (processing of generating the comparison result image 65). In step S60, first, the logical inversion operation based on the edge image 74 is performed (step S62). As a result, an edge inversion image 741 as illustrated in FIG. 27 is generated. Next, the logical AND operation based on the difference image 64 (see FIG. 14) and the edge inversion image 741 is performed (step S64). As a result, the comparison result image 65 as illustrated in FIG. 28 is generated. The comparison result image 65 illustrated in FIG. 28 includes two partial difference result images 651 and 652. When the comparison result image 65 is generated by the logical AND operation described above, the processing in step S60 ends.

Figure 29:
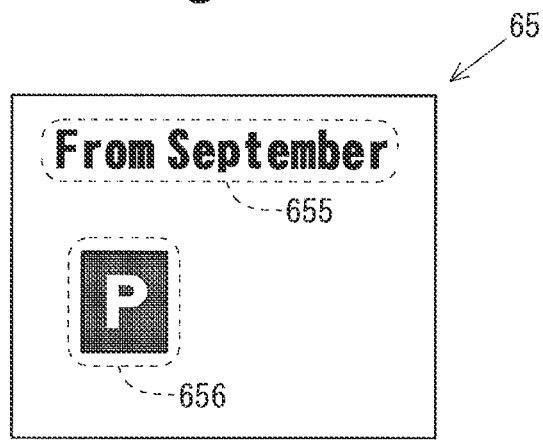
FIG. 29 is a diagram for illustration of processing of combining two or more adjacent partial difference result images in the embodiment.
Figure 30:
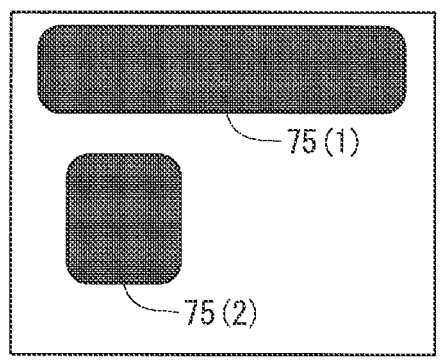
FIG. 30 is a diagram for illustration of processing of combining two or more adjacent partial difference result images in the embodiment.

After the comparison result image 65 is generated, the proximity image combining unit 157 combines two or more partial difference result images close to each other into one (step S70). In step S70, the expansion processing taking the expansion width of 10-15 pixels, for example, is performed on each of the plurality of partial difference result images. As a result, two or more partial difference result images close to each other are combined. Regarding this step S70, for example, it is assumed that the comparison result image 65 as illustrated in FIG. 29 is generated in step S60. In this case, the partial difference result image of the portion denoted by a reference numeral 655 in FIG. 29 is subjected to the expansion processing to generate the combined image denoted by a reference numeral 75(1) in FIG. 30, and the partial difference result image of the portion denoted by reference numeral 656 in FIG. 29 is subjected to the expansion processing to generate the combined image denoted by a reference numeral 75(2) in FIG. 30.

Figure 31:
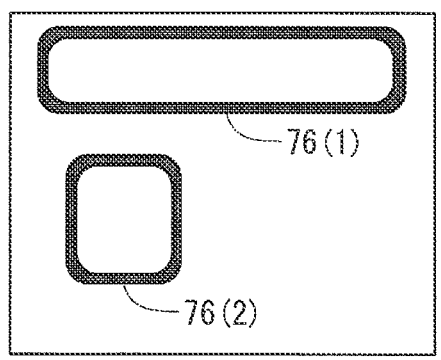
FIG. 31 is a diagram for illustration of generation of a combined contour image in the embodiment.

Next, the combined image contour extraction unit 158 removes an image obtained by applying the contraction processing to the combined image 75 generated in step S70 from the combined image 75, to generate the combined contour image 76 (step S80). More specifically, first, for example, the contraction processing with the contraction width of 1 pixel is performed on the combined image 75. As a result, a contraction combined image is generated similarly to step S20 described above. Next, the exclusive OR (XOR) operation of the combined image 75 and the contracted combined image is performed. As a result, the combined contour image 76 is generated. For example, the combined contour image denoted by a reference numeral 76(1) in FIG. 31 is generated based on a combined image denoted by a reference numeral 75(1) in FIG. 30, and the combined contour image denoted by a reference numeral 76(2) in FIG. 31 is generated based on a combined image denoted by a reference numeral 75(2) in FIG. 30.

Finally, the comparison result display unit 159 displays the comparison result image 65 on the display unit 123 in a mode in which portion determined to have a difference between the original image 61 and the calibration image 62 is colored (step S90). In this regard, for example, the comparison result image 65 may be displayed in a mode such as "portion having no difference: display in gray, portion corresponding to the positive difference image 64a in portion having a difference: display by coloring with a first designated color designated by the user, and portion corresponding to the negative difference image 64b in portion having a difference: display by coloring with a second designated color designated by the user", or the comparison result image 65 may be displayed in a mode such as "portion with no difference: gray display, portion with difference: display by coloring with a color of calibration image 62". As the comparison result image 65 is displayed on the display unit 123 in this manner, the image comparison processing ends.

Figure 32:
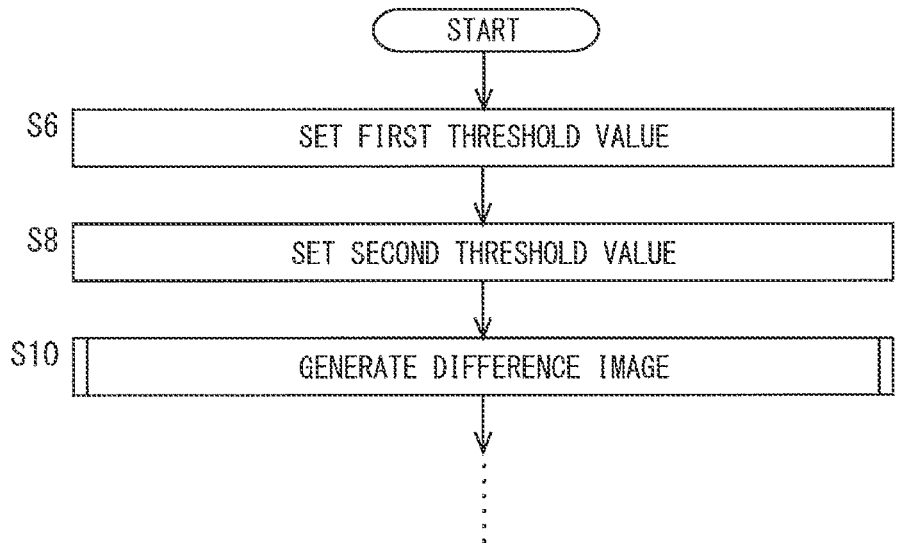
FIG. 32 is a flowchart for describing provision of a step of setting a first threshold value and a step of setting a second threshold value in the embodiment.

In the present embodiment, the image comparison processing as described above is performed by the online calibration server 10 (see FIG. 1) in the printing company. Note that a step of setting the first threshold value TH1 by the user is preferably provided before step S50. In addition, a step of setting the second threshold value TH2 by the user is preferably provided before step S14. In this regard, for example, as illustrated in FIG. 32, step S6 of setting the first threshold value TH1 and step S8 of setting the second threshold value TH2 may be provided before step S10.

Figure 33:
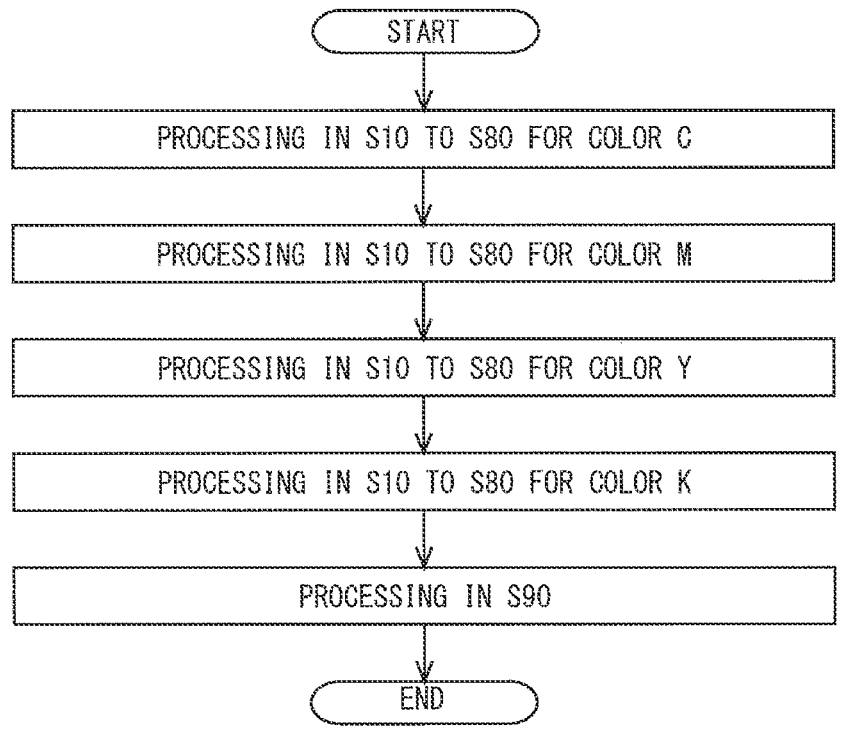
FIG. 33 is a flowchart for describing that the processing of steps S10 to S80 of FIG. 6 is performed for each ink color in the embodiment.

Meanwhile, an image to be subjected to the image comparison processing includes images of a plurality of ink colors. Further, the processing of steps S10 to S80 of FIG. 6 is performed for each ink color. For example, an image including four colors of C color (cyan), M color (magenta), Y color (yellow), and K color (black) is set as a target of the image comparison processing, and the processing of steps S10 to S80 of FIG. 6 is performed for each of the four colors. In this case, an overall flow of the image comparison processing is as illustrated in FIG. 33, for example. Furthermore, for example, an image including (Z+4) (Z is a natural number) colors obtained by adding Z spot colors to C, M, Y, and K colors is set as a target of the image comparison processing, and the processing of steps S10 to S80 of FIG. 6 is performed for each of the (Z+4) colors. Furthermore, for example, in the case of print data of only two colors of K color and M color, an image including K color and M color is a target of the image comparison processing, and the processing of steps S10 to S80 of FIG. 6 is performed for each of the two colors. By adopting the configuration in which the processing is performed for each ink color as described above, capacity of the memory required for the device functioning as the image comparison device (in the present embodiment, the online calibration server 10) can be reduced as compared with the configuration in which the processing of a plurality of ink colors is collectively performed.

Note that, in the present embodiment, a difference image generation step is implemented by step S10, a difference pixel extraction step is implemented by step S12, a binarization step is implemented by step S14, a filter step is implemented by step S16, a contraction step is implemented by step S20, an outline image generation step is implemented by step S30, a candidate image generation step is implemented by step S40, an edge image generation step is implemented by step S50, a comparison result image generation step is implemented by step S60, a logical inversion operation step is implemented by step S62, a logical AND operation step is implemented by step S64, a proximity image combining step is implemented by step S70, and a comparison result display step is implemented by step S90. The original image 61 corresponds to the first image, and the calibration image 62 corresponds to the second image.

4. Effects

According to the image comparison processing in the present embodiment, not all regions determined to have a difference between the original image 61 and the calibration image 62 are detected as the difference portions, but a region obtained by excluding the edge region of the image from the regions determined to have a difference between the original image 61 and the calibration image 62 is detected as the difference portion. That is, even if the quantization error occurs, the edge portion of the image is not detected as the difference portion.

Meanwhile, according to the method disclosed in Japanese Laid-Open Patent Publication No. 2019-211319, as described above, comparison of four combinations (comparison between the expanded image corresponding to the reference image and the inspection image, comparison between the contracted image corresponding to the reference image and the inspection image, comparison between the expanded image corresponding to the inspection image and the reference image, and comparison between the contracted image corresponding to the inspection image and the reference image) is necessary, and it is required to perform calculation for the comparison with 9 pixels (comparison with 18 pixels in consideration of positive and negative signs) for each pixel in comparison for each combination. On the other hand, according to the present embodiment, when the edge image 74 representing the edge region is generated, only the pixels constituting the candidate image 73 representing the candidate portion of the edge region are set as the processing target pixels. Then, comparison between the pixel value of the processing target pixel in the calibration image 62 and each of the pixel values of the nine pixels centered on the processing target pixel in the original image 61, and comparison between the pixel value of the processing target pixel in the original image 61 and each of the pixel values of the nine pixels centered on the processing target pixel in the calibration image 62 are performed. Thus, according to the present embodiment, it is possible to detect a difference between two images in shorter time than before without causing erroneous detection. Since the calculation time is shortened, the power consumption is reduced, and it is possible to contribute to the achievement of the SDGs (Sustainable Development Goals).

As above, according to the present embodiment, it is possible to realize an image comparison method capable of detecting a difference between two images in short time while suppressing occurrence of erroneous detection due to quantization errors or the like.

5. Modifications

Figure 34:
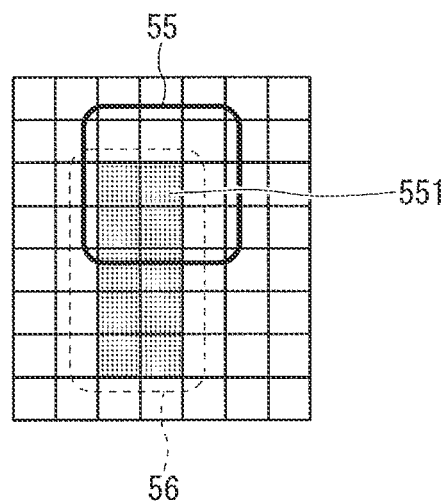
FIG. 34 is a diagram for illustration of detection omission of a difference portion in a case where an image representing a pale thin line is added.

In the above embodiment, it is determined that the processing target pixel 551 is not a pixel constituting the edge region in the case where the image in the vicinity of the processing target pixel 551 in the original image 61 is as illustrated in FIG. 23 and the image in the vicinity of the processing target pixel 551 in the calibration image 62 is as illustrated in FIG. 24. As a case similar to this, a case is assumed in which an image in the vicinity of the processing target pixel 551 in the original image 61 is as illustrated in FIG. 23 and an image in the vicinity of the processing target pixel 551 in the calibration image 62 is as illustrated in FIG. 34 (hereinafter, this case is referred to as "pale thin line case" for convenience). Note that the image of a portion denoted by a reference numeral 56 in FIG. 34 is assumed to be a pale color image obtained by moving an image representing a thin line having a width of 1 pixel leftward by 0.5 pixels due to a quantization error.

In the pale thin line case as described above, in step S50 in FIG. 6, it is determined that the difference between each of pixel values of the nine comparison target pixels (the nine pixels existing in the thick frame denoted by the reference numeral 55 in FIG. 23) in the original image 61 and a pixel value of the processing target pixel 551 (see FIG. 34) in the calibration image 62 is less than or equal to the first threshold value TH1, and that the difference between each of pixel values of the nine comparison target pixels (the nine pixels existing in the thick frame denoted by a reference numeral 55 in FIG. 34) in the calibration image 62 and a pixel value of the processing target pixel 551 (see FIG. 23) in the original image 61 is less than or equal to the first threshold value TH1. That is, since the first condition is satisfied, the processing target pixel 541 is determined to be a pixel constituting the edge region. As a result, a portion denoted by a reference numeral 56 in FIG. 34 is not detected as the difference portion (detection omission occurs). Therefore, a method of appropriately detecting a thin line having a small gradation difference from the surroundings as a difference portion when the thin line is added by correction will be described below as a modification of the above embodiment.

Figure 35:
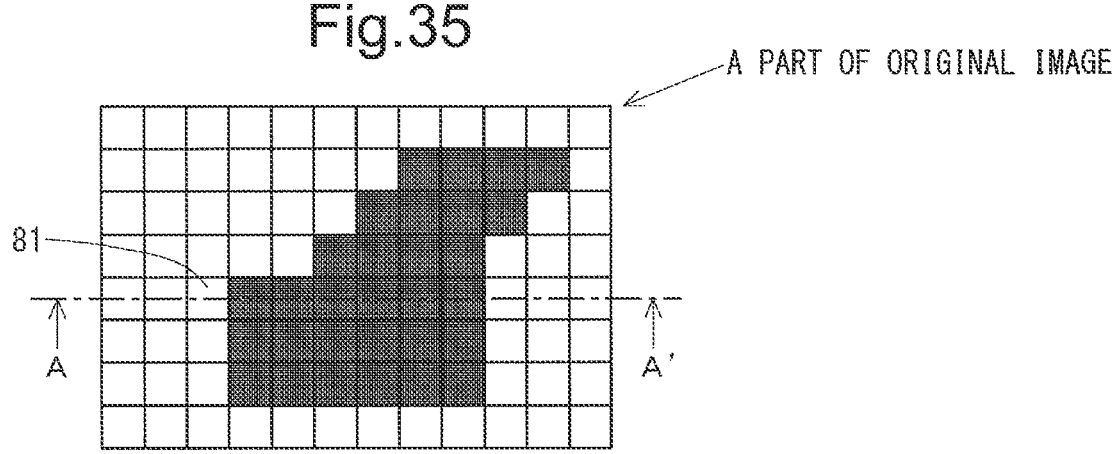
FIG. 35 is a diagram for illustration of a concept of providing a second condition in a modification of the embodiment.
Figure 36:
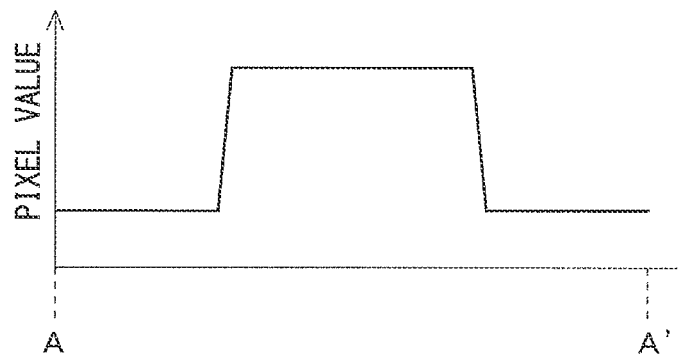
FIG. 36 is a diagram for illustration of a concept of providing the second condition in the modification of the embodiment.
Figure 37:
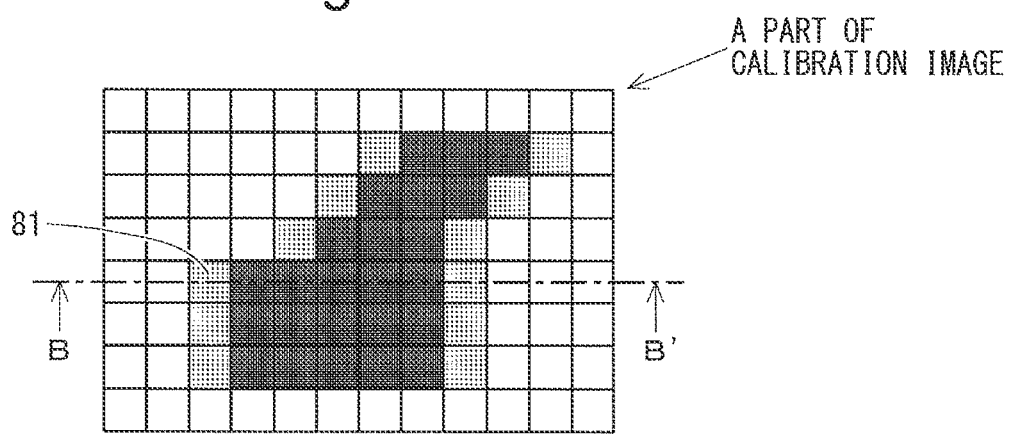
FIG. 37 is a diagram for illustration of a concept of providing the second condition in the modification of the embodiment.
Figure 38:
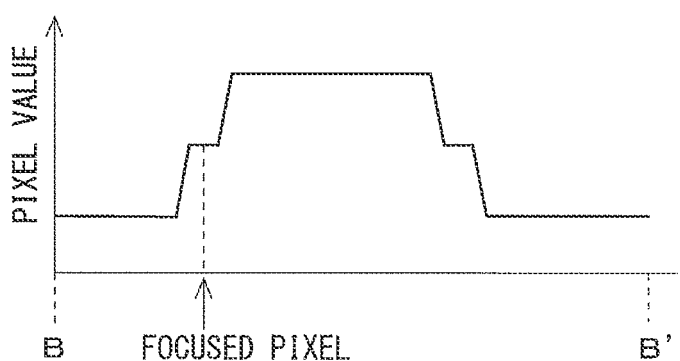
FIG. 38 is a diagram for illustration of a concept of providing the second condition in the modification of the embodiment.

First, a concept in the present modification will be described. Regarding the image of the portion denoted by the reference numeral 501 in FIG. 3, a graph representing pixel values of the portion indicated in a line A-A' in FIG. 35 is as illustrated in FIG. 36. Furthermore, regarding the image of the portion denoted by the reference numeral 502 in FIG. 4, a graph representing pixel values of the portion indicated in a line B-B' in FIG. 37 is as illustrated in FIG. 38. Here, a pixel denoted by a reference numeral 81 in FIGS. 35 and 37 is referred to as "focused pixel". As can be seen from FIGS. 35 to 38, the nine pixels centered on the focused pixel 81 in the original image include a pixel having a pixel value less than or equal to a pixel value of the focused pixel 81 in the calibration image and a pixel having a pixel value greater than or equal to the pixel value of the focused pixel 81 in the calibration image. In other words, the pixel value of the focused pixel 81 in the calibration image falls within the range from a minimum value to a maximum value of the pixel values of the nine pixels centered on the focused pixel 81 in the original image. The pixel value of the focused pixel 81 in the original image also falls within the range from the minimum value to the maximum value of the pixel values of the nine pixels centered on the focused pixel 81 in the calibration image.

Figure 39:
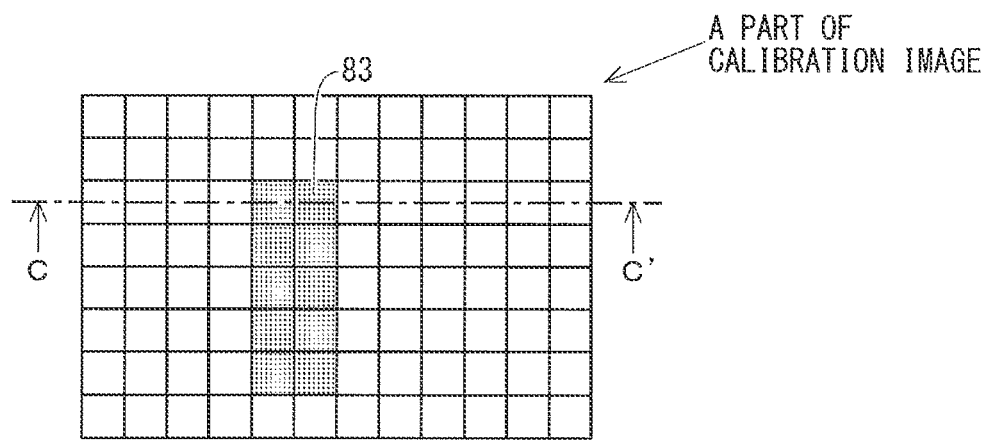
FIG. 39 is a diagram for illustration of a concept of providing the second condition in the modification of the embodiment.
Figure 40:
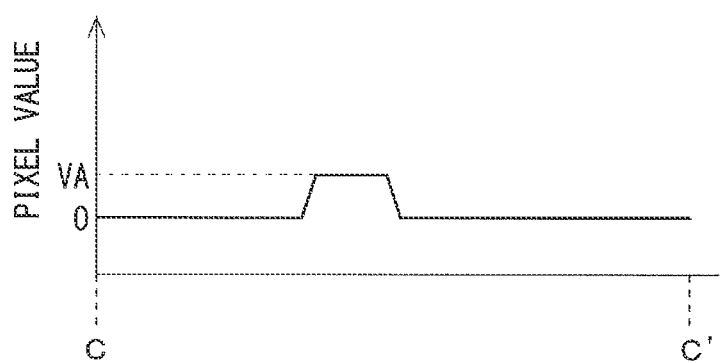
FIG. 40 is a diagram for illustration of a concept of providing the second condition in the modification of the embodiment.
Figure 41:
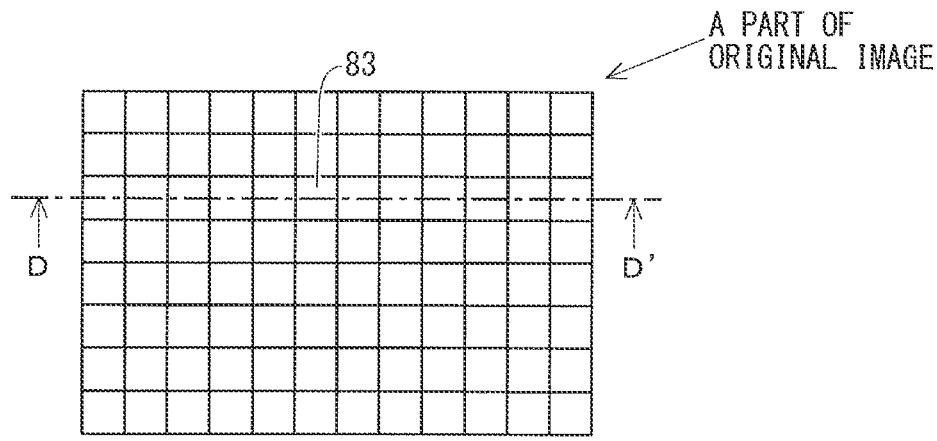
FIG. 41 is a diagram for illustration of a concept of providing the second condition in the modification of the embodiment.
Figure 42:
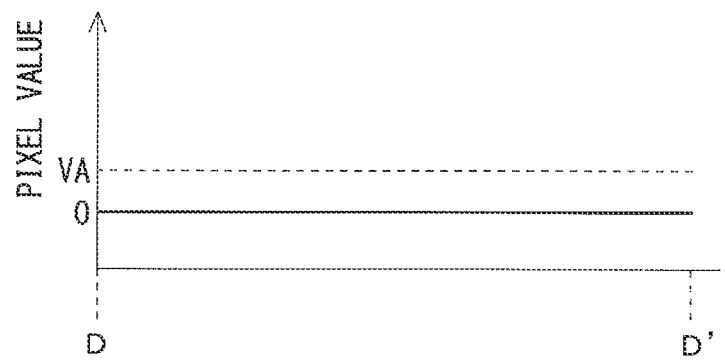
FIG. 42 is a diagram for illustration of a concept of providing the second condition in the modification of the embodiment.

Regarding the image illustrated in FIG. 34, a graph representing pixel values of a portion indicated by a line C-C' in FIG. 39 is as illustrated in FIG. 40. Furthermore, regarding the corresponding portion in the original image, a graph representing pixel values of a portion indicated by a line D-D' in FIG. 41 is as illustrated in FIG. 42. Here, a pixel denoted by a reference numeral 83 in FIGS. 39 and 41 is referred to as a "focused pixel". As can be seen from FIGS. 39 to 42, a pixel value of the focused pixel 83 in the calibration image is greater than a pixel value of any of the nine pixels centered on the focused pixel 83 in the original image. Thus, for the portion not constituting the edge of the image, the pixel value of the focused pixel in at least one of the original image and the calibration image falls outside the range from a minimum value to a maximum value of the pixel values of the nine pixels centered on the focused pixel in the other of the original image and the calibration image.

In view of the above, in the present modification, in step S50 in FIG. 6, the edge image generation unit 155 determines the processing target pixel to be the pixel constituting the edge region when a second condition is satisfied in addition to the first condition, the second condition being a condition in which the pixel value of the processing target pixel in the calibration image falls within the range from the minimum value to the maximum value of the pixel values of the nine comparison target pixels in the original image, and the pixel value of the processing target pixel in the original image falls within the range from the minimum value to the maximum value of the pixel values of the nine comparison target pixels in the calibration image.

According to the present modification, in a case in which a thin line having a small gradation difference from the surroundings is added by correction, pixels constituting the thin line are not determined to be pixels constituting the edge region. That is, the thin line is appropriately detected as the difference portion. Thus, according to the present modification, it is possible to realize an image comparison method capable of accurately detecting a difference between two images in short time while suppressing occurrence of erroneous detection due to quantization errors or the like.

6. Others

Figure 43:
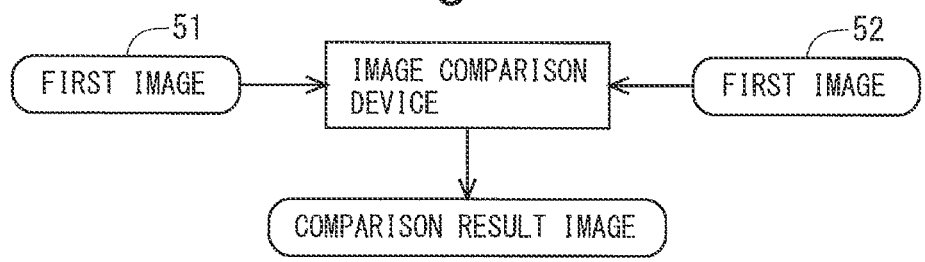
FIG. 43 is a diagram for describing that the present invention can also be applied to a case where two multi-valued images are compared for a purpose other than plate inspection.
Figure 44:
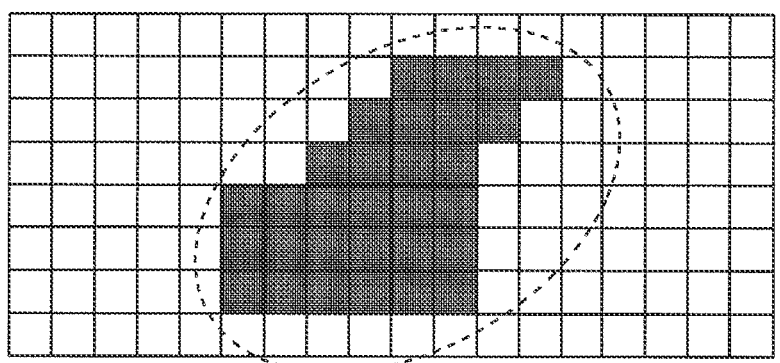
FIG. 44 is a diagram for illustration of a conventional example.
Figure 45:
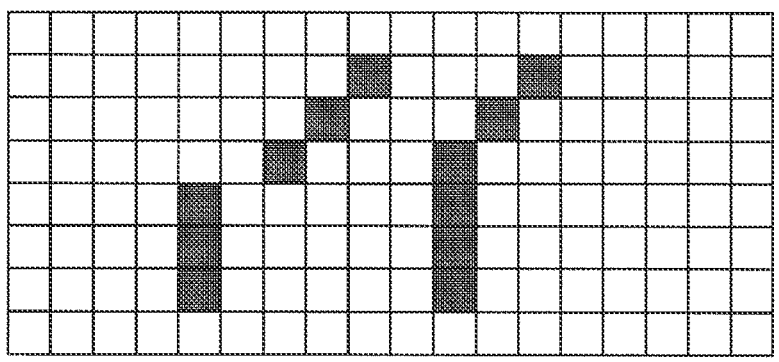
FIG. 45 is a diagram for illustration of the conventional example.

The present invention is not limited to the above-described embodiment, and various modifications can be made without departing from the spirit of the present invention. For example, although the example in which two images are compared for the purpose of plate inspection has been described in the above embodiment, the present invention is not limited to this example. The present invention can also be applied to a case (see FIG. 43) where two multi-valued images (the first image 51 and the second image 52) are compared and a comparison result image obtained by the comparison is displayed for a purpose other than plate inspection. Furthermore, for example, the comparison result image 65 generated in step S60 may be displayed on the display unit 123 as it is without performing the processing of steps S70 and S80 in FIG. 6.

Although the present invention has been described in detail above, the above description is illustrative in all aspects and is not restrictive. It is understood that numerous other modifications and variations can be devised without departing from the scope of the present invention.

This application is an application claiming priority based on Japanese Patent Application No. 2022-138973 entitled "Image Comparison Method, Image Comparison Device, and Image Comparison Program" filed on Sep. 1, 2022, and the contents of which are herein incorporated by reference.

What is claimed is:

1. An image comparison method for comparing a first image that is a multi-valued image and a second image that is a multi-valued image, the image comparison method comprising:

a difference image generation step of generating, based on the first image and the second image, a difference image that is a binary image representing a portion having a difference between the first image and the second image, the difference image including one or more partial difference images each including one or more pixels;

a contraction step of performing contraction processing to each of the one or more partial difference images to generate a contracted image including one or more partial contracted images;

an outline image generation step of generating an outline image by removing the contracted image from the difference image, the outline image including one or more partial outline images each including one or more pixels;

a candidate image generation step of generating a candidate image by removing a partial outline image that is adjacent to the partial contracted image from the one or more partial outline images, the candidate image representing a portion as a candidate of an edge region, the candidate image including one or more partial candidate images each including one or more pixels;

an edge image generation step of generating an edge image representing an edge region based on the first image, the second image, and the candidate image; and a comparison result image generation step of generating a comparison result image by removing the edge image from the difference image, wherein in the edge image generation step, assuming that one or more pixels constituting the one or more partial candidate images included in the candidate image are sequentially set as a processing target pixel, and that the processing target pixel and eight pixels around the processing target pixel are set as nine comparison target pixels, the processing target pixel is determined to be a pixel constituting the edge region when a first condition is satisfied, the first condition being a condition in which a difference between a pixel value of at least one of the nine comparison target pixels in the first image and a pixel value of the processing target pixel in the second image is less than or equal to a first threshold value, and a difference between a pixel value of at least one of the nine comparison target pixels in the second image and a pixel value of the processing target pixel in the first image is less than or equal to the first threshold value.

2. The image comparison method according to claim 1, wherein
in the edge image generation step, the processing target pixel is determined to be the pixel constituting the edge region when a second condition is satisfied in addition to the first condition, the second condition being a condition in which a pixel value of the processing target pixel in the second image falls within a range from a minimum value to a maximum value of pixel values of the nine comparison target pixels in the first image, and a pixel value of the processing target pixel in the first image falls within a range from a minimum value to a maximum value of pixel values of the nine comparison target pixels in the second image.

3. The image comparison method according to claim 1, wherein
the difference image generation step includes:
a difference pixel extraction step of extracting pixels having a difference pixel values between the first image and the second image; and
a binarization step of generating the difference image by regarding a pixel among the pixels extracted in the difference pixel extraction step whose difference between a pixel value in the first image and a pixel value in the second image is greater than or equal to a second threshold value to have a difference between the first image and the second image, and regarding a pixel among the pixels extracted in the difference pixel extraction step whose difference between a pixel value in the first image and a pixel value in the second image is less than the second threshold value and a pixel that has not extracted in the difference pixel extraction step to have no difference between the first image and the second image.

4. The image comparison method according to claim 3, wherein
the difference image generation step further includes: a filter step of removing a partial difference image constituted by a predetermined number or less of pixels from out of one or more partial difference images included in the difference image generated in the binarization step.

5. The image comparison method according to claim 3, further comprising:
a second threshold value setting step of setting the second threshold value by a user before the binarization step.

6. The image comparison method according to claim 1, wherein
in the outline image generation step, the outline image is generated by performing an exclusive OR operation based on the difference image and the contracted image.

7. The image comparison method according to claim 1, wherein
the comparison result image generation step includes:
a logical inversion operation step of generating an edge inversion image by performing a logic inversion operation based on the edge image; and
a logical AND operation step of generating the comparison result image by performing a logical AND operation based on the difference image and the edge inversion image.

8. The image comparison method according to claim 1, wherein
in the difference image generation step, a first difference image based on a pixel having a pixel value higher in the first image than in the second image and a second difference image based on a pixel having a pixel value higher in the second image than in the first image are generated as the difference image,
in the contraction step, the outline image generation step, the candidate image generation step, the edge image generation step, and the comparison result image generation step, processing based on the first difference image and processing based on the second difference image are performed, and
in the comparison result image generation step, a first comparison result image obtained by the processing based on the first difference image and a second comparison result image obtained by the processing based on the second difference image are generated as the comparison result image.

9. The image comparison method according to claim 1, further comprising:
a first threshold value setting step of setting the first threshold value by a user before the edge image generation step.

10. The image comparison method according to claim 1, wherein
the first image and the second image respectively include images of a plurality of ink colors, and
the processing in the difference image generation step, the contraction step, the outline image generation step, the candidate image generation step, the edge image generation step, and the comparison result image generation step is performed for each of the ink colors.

11. The image comparison method according to claim 1, wherein
the comparison result image generated in the comparison result image generation step includes a plurality of partial difference result images each including one or more pixels, and
the image comparison method includes a proximity image combining step of combining two or more partial difference result images close to each other by applying expansion processing to each of the plurality of partial difference result images, after the comparison result image generation step.

12. The image comparison method according to claim 1, further comprising:
a comparison result display step of displaying the comparison result image on a display unit of a computer, wherein
in the comparison result display step, a portion determined to have a difference between the first image and the second image is displayed by coloring.

13. The image comparison method according to claim 12, wherein
in the difference image generation step, a first difference image based on a pixel having a pixel value higher in the first image than in the second image and a second difference image based on a pixel having a pixel value higher in the second image than in the first image are generated as the difference image, and
in the comparison result display step, a portion corresponding to the first difference image and a portion corresponding to the second difference image are displayed by coloring with different colors.

14. An image comparison device for comparing a first image that is a multi-valued image and a second image that is a multi-valued image, the image comparison device comprising:
a processor configured to perform a difference image generation processing of generating, based on the first image and the second image, a difference image that is a binary image representing a portion having a difference between the first image and the second image, the difference image including one or more partial difference images each including one or more pixels;

a contracted image generation processing of performing contraction processing to each of the one or more partial difference images to generate a contracted image including one or more partial contracted images;

an outline image generation processing of generating an outline image by removing the contracted image from the difference image, the outline image including one or more partial outline images each including one or more pixels;

a candidate image generation processing of generating a candidate image by removing a partial outline image that is adjacent to the partial contracted image from the one or more partial outline images, the candidate image representing a portion as a candidate of an edge region, the candidate image including one or more partial candidate images each including one or more pixels;

an edge image generation processing of generating an edge image representing an edge region based on the first image, the second image, and the candidate image; and a comparison result image generation processing of generating a comparison result image by removing the edge image from the difference image, wherein in the edge image generation processing, the processor determines, assuming that one or more pixels constituting the one or more partial candidate images included in the candidate image are sequentially set as a processing target pixel, and that the processing target pixel and eight pixels around the processing target pixel are set as nine comparison target pixels, the processing target pixel to be a pixel constituting the edge region when a first condition is satisfied, the first condition being a condition in which a difference between a pixel value of at least one of the nine comparison target pixels in the first image and a pixel value of the processing target pixel in the second image is less than or equal to a first threshold value, and a difference between a pixel value of at least one of the nine comparison target pixels in the second image and a pixel value of the processing target pixel in the first image is less than or equal to the first threshold value.

15. A non-transitory computer-readable recording medium recording an image comparison program for comparing a first image that is a multi-valued image and a second image that is a multi-valued image, the image comparison program causing a computer to execute:

a difference image generation step of generating, based on the first image and the second image, a difference image that is a binary image representing a portion having a difference between the first image and the second image, the difference image including one or more partial difference images each including one or more pixels;

a contraction step of performing contraction processing to each of the one or more partial difference images to generate a contracted image including one or more partial contracted images;

an outline image generation step of generating an outline image by removing the contracted image from the difference image, the outline image including one or more partial outline images each including one or more pixels;

a candidate image generation step of generating a candidate image by removing a partial outline image that is adjacent to the partial contracted image from the one or more partial outline images, the candidate image representing a portion as a candidate of an edge region, the candidate image including one or more partial candidate images each including one or more pixels;

an edge image generation step of generating an edge image representing an edge region based on the first image, the second image, and the candidate image; and a comparison result image generation step of generating a comparison result image by removing the edge image from the difference image, wherein in the edge image generation step, assuming that one or more pixels constituting the one or more partial candidate images included in the candidate image are sequentially set as a processing target pixel, and that the processing target pixel and eight pixels around the processing target pixel are set as nine comparison target pixels, the processing target pixel is determined to be a pixel constituting the edge region when a first condition is satisfied, the first condition being a condition in which a difference between a pixel value of at least one of the nine comparison target pixels in the first image and a pixel value of the processing target pixel in the second image is less than or equal to a first threshold value, and a difference between a pixel value of at least one of the nine comparison target pixels in the second image and a pixel value of the processing target pixel in the first image is less than or equal to the first threshold value.

* * * * *